United States Patent
Pope et al.

(10) Patent No.: US 12,242,553 B1
(45) Date of Patent: Mar. 4, 2025

(54) DYNAMIC SEARCH SYSTEMS AND METHODS OF USING THE SAME

(71) Applicant: Prodigo Solutions Inc., Cranberry Township, PA (US)

(72) Inventors: Dermot Kelly Pope, Gibsonia, PA (US); Aaron Manuel, Cranberry Township, PA (US)

(73) Assignee: PRODIGO SOLUTIONS INC., Cranberry Township, PA (US)

( * ) Notice: Subject to any disclaimer, the term of this patent is extended or adjusted under 35 U.S.C. 154(b) by 0 days.

(21) Appl. No.: 17/863,231

(22) Filed: Jul. 12, 2022

Related U.S. Application Data

(60) Provisional application No. 63/221,082, filed on Jul. 13, 2021.

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .......................... G06F 16/9535; G06F 16/9538
See application file for complete search history.

(56) References Cited

U.S. PATENT DOCUMENTS

| | | | |
|---|---|---|---|
| 7,117,163 B1 | 10/2006 | Iyer et al. | |
| 7,236,944 B1 | 6/2007 | Schwartz et al. | |
| 7,693,748 B1 | 4/2010 | Mesaros | |
| 8,069,096 B1 | 11/2011 | Ballaro et al. | |
| 8,606,723 B2 | 12/2013 | Seubert et al. | |
| 8,666,914 B1 * | 3/2014 | Dupin ................. | G06F 16/3346 706/12 |

(Continued)

FOREIGN PATENT DOCUMENTS

| | | |
|---|---|---|
| CN | 101147167 | 3/2008 |
| WO | 2012075304 | 6/2012 |
| WO | 2014145229 | 9/2014 |

OTHER PUBLICATIONS

Grimm, How to Rank Well in Amazon, the US's Largest Product Search Engine, https://moz.com/blog/amazon-seo-organic-search-ranking-factors#factors, Jun. 4, 2014.

(Continued)

*Primary Examiner* — Albert M Phillips, III
*Assistant Examiner* — Fatima P Mina
(74) *Attorney, Agent, or Firm* — SNELL & WILMER L.L.P.

(57) ABSTRACT

Systems and methods for searching subsets of a search space. The system includes a memory with programmable instructions for searching a search space stored thereon, and processor for executing the programmable instructions. A user enters a search query, for example, via the user interface. The system receives a search command including the search query. The system performs a first search of a first subset of the of the search space using the search query. The results from the first search are presented to the user. The system receives a second, supplemental search command from the user, and responsive to the second, supplemental search command, performs a second search, using the same search query, of a second subset of the search space.

20 Claims, 18 Drawing Sheets

(56) References Cited

U.S. PATENT DOCUMENTS

| | | | |
|---|---|---|---|
| 8,756,117 | B1 | 6/2014 | Ballaro et al. |
| 8,903,810 | B2 | 12/2014 | Ismalon |
| 9,202,246 | B1 | 12/2015 | Bundy et al. |
| 9,785,712 | B1* | 10/2017 | Lazar ................ G06F 16/24578 |
| 2002/0083062 | A1 | 6/2002 | Neal et al. |
| 2007/0100797 | A1 | 5/2007 | Thun et al. |
| 2007/0162424 | A1* | 7/2007 | Jeh ...................... G06F 16/2365 |
| 2009/0119261 | A1* | 5/2009 | Ismalon ............. G06F 16/9535 |
| | | | 707/999.005 |
| 2009/0132483 | A1 | 5/2009 | Yang et al. |
| 2009/0187558 | A1 | 7/2009 | McDonald |
| 2009/0327224 | A1 | 12/2009 | White et al. |
| 2010/0306191 | A1* | 12/2010 | LeBeau ............. G06F 16/24578 |
| | | | 707/723 |
| 2011/0184936 | A1* | 7/2011 | Lymberopoulos ......................... |
| | | | G06F 16/9574 |
| | | | 707/E17.014 |
| 2011/0218864 | A1* | 9/2011 | Pentz ................. G06Q 30/0241 |
| | | | 707/E17.014 |
| 2014/0019244 | A1 | 1/2014 | Gundapaneni et al. |
| 2014/0200979 | A1 | 7/2014 | Mizumura et al. |
| 2014/0258236 | A1* | 9/2014 | Vijayan ................. G06F 16/116 |
| | | | 707/674 |
| 2016/0055220 | A1* | 2/2016 | Joshi ..................... G06F 16/319 |
| | | | 707/722 |
| 2016/0078101 | A1* | 3/2016 | Somaiya ............ G06F 16/3322 |
| | | | 707/706 |
| 2016/0162830 | A1* | 6/2016 | Devaiah ............ G06Q 30/0605 |
| | | | 705/28 |
| 2016/0328782 | A1 | 11/2016 | Bhojwani et al. |
| 2016/0357809 | A1* | 12/2016 | Patel ................... G06F 16/2471 |
| 2018/0197133 | A1* | 7/2018 | Linke ..................... G06Q 50/22 |
| 2019/0012390 | A1* | 1/2019 | Nishant .................. G06N 3/006 |
| 2021/0133609 | A1* | 5/2021 | Lee ....................... G06F 16/433 |
| 2021/0286780 | A1* | 9/2021 | Harale ..................... G06N 5/04 |
| 2022/0092680 | A1* | 3/2022 | Defrancesco .... G06Q 10/06315 |

OTHER PUBLICATIONS

USPTO; Non-Final Office Action dated Sep. 16, 2019 in U.S. Appl. No. 15/373,696.

USPTO; Non-Final Office Action dated Jul. 14, 2020 in U.S. Appl. No. 15/373,696.

USPTO; Final Office Action dated Nov. 4, 2020 in U.S. Appl. No. 15/373,696.

USPTO; Advisory Action dated Feb. 11, 2021 in U.S. Appl. No. 15/373,696.

USPTO; Non-Final Office Action dated Oct. 6, 2021 in U.S. Appl. No. 15/373,696.

USPTO; Final Office Action dated May 17, 2022 in U.S. Appl. No. 15/373,696.

USPTO; Advisory Action dated Aug. 11, 2022 in U.S. Appl. No. 15/373,696.

USPTO; Non-Final Office Action dated Nov. 30, 2022 in U.S. Appl. No. 15/373,696.

Hillard, Dustin. Improving ad relevance in sponsored search. Yahoo Labs [online]. Feb. 4, 2010 .[retrieved on: Sep. 30, 2021 ]. Retrieved from the Internet: http://www.wsdm-conference.org/2010/proceedings/docs/p361.pdf (Year: 2010), pp. 361-369.

Nurmi, Petteri. Ranking and Recommending Grocery product promotions. ACM [online]. 2014 .[retrieved on: Apr. 28, 2022 ]. Retrieved from the Internet: https://dl.acm.org/doi/pdf/10.1145/2584249 (Year: 2014), pp. 1-23.

Dana, James. Purchase discount and price discriminations. University of chicago [online]. Publication date: Apr. 1998 . [retrieved on: Nov. 19, 2022]. Retrieved from the Internet: URL: https://www.jstor.org/stable/pdf/10.1086/250014.pdf (Year: 1998), pp. 395-422.

USPTO; Restriction/Election Requirement dated Feb. 25, 2019 in U.S. Appl. No. 15/373,696.

USPTO; Non-Final Office Action dated Sep. 6, 2023 in U.S. Appl. No. 15/373,696.

Wihelm, "Sustainability in multi-tier supply chains Journal", Elsevier [online].2016, Retrieved on: Aug. 26, 2023, https://www.sciencedirect.com/science/article/abs/pii/S0272696315300115>, 5 pages.

USPTO; Final Office Action dated Nov. 22, 2023 in U.S. Appl. No. 15/373,696.

Yucel et al., "Optimizing Product Assortment Under Customer Driven Demand Substitution", Elsevier, 2009, retrieved on: Nov. 16, 2023, https://www.sciencedirect.com/science/article/pii/S037722170800698X, pp. 759-768.

USPTO; Advisory Action dated Jan. 26, 2024 in U.S. Appl. No. 15/373,696.

USPTO; Non-Final Office Action dated Apr. 5, 2024 in U.S. Appl. No. 15/373,696.

Fu et al., "Enabling Personalized Search Over Encrypted Outsourced Data with Efficiency Improvement", Journal: IEEE [online], Publication date: 2015 .[retrieved on: Feb. 24, 2024 ]. Retrieved from the Internet: < URL: https://ieeexplore.ieee.org/stamp/stamp.jsp?arnumber=7349214>, vol. 17 No. 9, (Year: 2015), pp. 2546-2559.

USPTO; Final Office Action dated Aug. 19, 2024 in U.S. Appl. No. 15/373,696.

Moon et al., "A win-win solution?: A critical analysis of tiered pricing to improve access to medicines in developing countries" Global Health 7, 39 (2011). https://doi.org/10.1186/1744-8603-7-39, pp. 1-11.

* cited by examiner

DYNAMIC SEARCH SYSTEMS AND METHODS OF USING THE SAME

CROSS-REFERENCE TO RELATED APPLICATIONS

The present application claims the benefit of U.S. Provisional Patent Application No. 63/221,082, filed on Jul. 13, 2021, titled "Dynamic Search Systems and Methods of Using the Same" which is incorporated by reference herein in its entirety.

TECHNICAL FIELD

The present disclosure relates generally to the field of computing, and more particularly, to systems and methods for dynamically indexing and searching a search space.

BACKGROUND

Search indexing is a process by which information in a search space is organized to facilitate information retrieval and to optimize the speed and search performance in finding relevant information in response to a search query.

Search engines that process search queries traditionally search the complete search space or an index of the complete search space that includes relevant information to the search query before returning a set of search results to a user. For large search spaces, this search can take several seconds. If the search results do not include the information or item that the user was seeking, the user must update their search query and execute another search based on the updated search query. In response to the updated search query, search engines start the search process over and again searches the search space or an index of the search space that includes relevant information to the updated search query. For large search spaces, this updated search can take several additional seconds. If the search results from the search based on the updated search query fail to return the sought after results, the user must again update their search query and the search process starts over based on the latest updates to the search query. Unfortunately, this type of search process may continue until the user gives up on their search, or correctly guesses the search query that would return the desired results. In any event, for large search spaces, each of these searches has taken several seconds.

In view of the above issues related to finding an optimal search query in order to get results that are relevant to the user, there is an unmet need for an improved searching system that reduces the length of time the user must wait as a search is executed and an improved searching system that eliminates or otherwise reduces the guesswork in finding the optimal search.

SUMMARY

In exemplary embodiments, a search space is split into at least primary and secondary subsets (e.g., primary and secondary indexes). When a query is presented, a search engine searches the primary subset (primary index) and presents the user with results. Those results might suffice for the user. If not, the user selects a user interface (e.g., clicking an icon such as a "deep dive" icon) causing the search engine to search the secondary subset (secondary index) (either alone or with the first subset) with the same query and present the user with those results.

In one exemplary embodiment, a system for searching a search space is provided. The system includes a memory including instructions for searching a search space stored thereon. The system also includes a processor in communication with the memory and configured to execute the instructions to perform various operations. The operations include identifying a search command including a user search query. The operations also include searching a first subset based on the search query to identify a first set of results. The first set of results are presented to the user. The operations further include identifying a second supplemental search command, and performing a second supplemental search based on the same search query. The second supplemental search searches one of a second subset of the search space and the first and second subset of the search space. A second set of results is identified based on the second supplemental search, and presented to the user. Additionally, the operations include identifying an item selected from the second set of results, and recording indexing data corresponding to the selected item to the first subset.

In another exemplary embodiment, a second system for searching a search space is provided. The system includes a memory including instructions for searching a search space stored thereon. The system also includes a processor in communication with the memory and configured to execute the instructions to perform various operations. The operations include identifying a search command including a user search query. The operations also include searching a first subset of the search space based on the search query. A first set of results is identified and presented to the user. The operations further include identifying a second supplemental search command and performing a second supplemental search based on the same search query. The second supplemental search searches one of a second subset of the search space and the first and second subsets of the search space. A second set of results based on the second supplemental search is identified and presented to the user.

In a further exemplary embodiment, a method of searching a search space is provided. The method includes receiving a search command from a user including a search query. The search query is received, for example, via a user interface of a user device. The method also includes performing a first search of a first subset of the search space using the search query. The search results from the first search are presented to the user. The method further includes receiving a second, supplemental search command from the user. Additionally, and responsive to the second, supplemental search command, the method includes performing a second search of a second subset of the search space using the same search query.

In yet a further exemplary embodiment, a method of searching a search space is provided. The method includes receiving a search command including a search query. The method also includes identifying one or more characters of the search query to determine if the search query is or includes a product code (e.g., a product number). Upon determining that the search query includes a product code, a first search of a first subset of the search space is performed using the search query. In some embodiments, the first subset is populated with product codes for each item of the search space. In some embodiments, upon determining that the search query includes a product code, a search of the first subset is a search of only a product code field for all items of the search space. The method further includes presenting the search results from the first search to the user. In some embodiments, a second search of a second subset using the same search query occurs asynchronously with respect to the first search, or in some embodiments, during or after presentation of the results of the first search to the user.

In embodiments, the method further includes receiving a second, supplemental search command from the user and, responsive to the second, supplemental search command, presenting the results from the second, supplemental search to the user.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Figure 1:
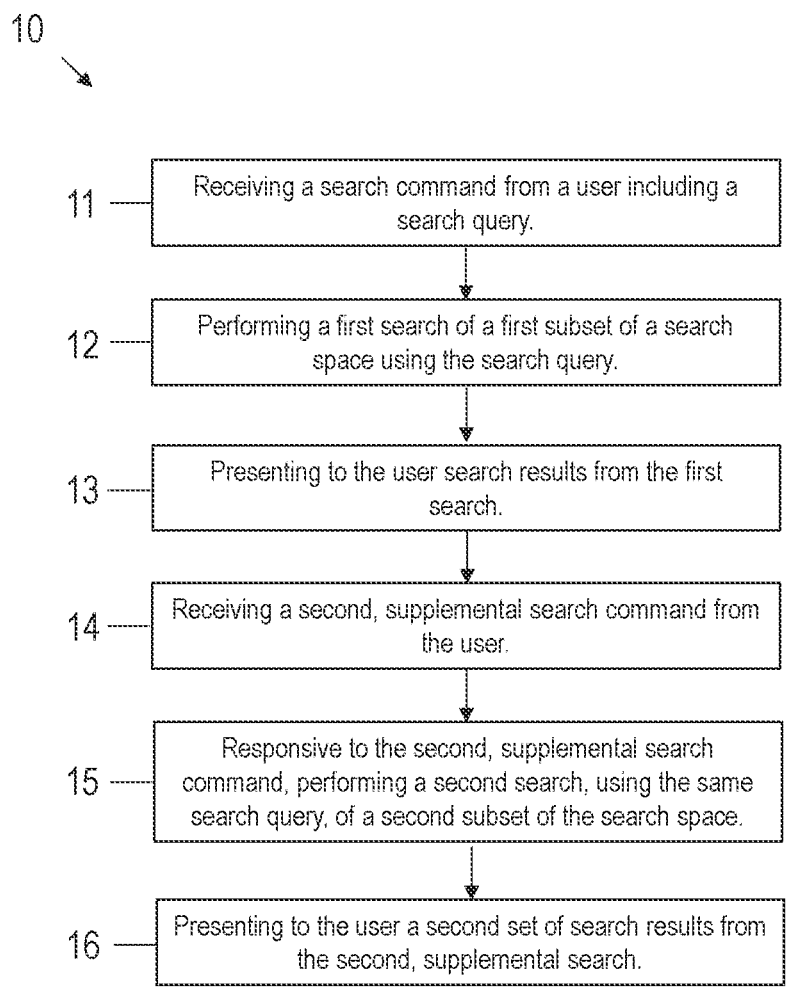
FIG. 1 illustrates a flowchart for an exemplary embodiment of a method of searching a search space in accordance with one or more embodiments shown and described herein.

Various embodiments will be understood more fully from the detailed description given below and from the accompanying drawings of the various aspects and implementations of the disclosure. This should not be taken to limit the embodiments to the specific aspects or implementations, which are being provided for explanation and understanding only.

At a high-level, the present application relates to splitting a search space into at least primary and secondary subsets. When a query is first received and a search is executed, only the first subset is initially searched. The same query is also used in a second subsequent search (also referred to herein as a second, supplemental search) of only the second subset. The second subsequent search is asynchronous with respect to the first search and occurring at or near a conclusion of the first search, or in some embodiments, when the results of the first search are identified and/or presented to the user.

In various embodiments, the first search occurs during a first time period defined by a start of the first search and a conclusion of the first search. The second search occurs during a second time period defined by a start of the second search and a conclusion of the second search. As referred to herein, "asynchronous" means that the first time period and the second time period begin at different times, and the first and second time periods may or may not overlap. In embodiments, the first time period and the second time period overlap such that the start of the second search occurs during the first time period (e.g., the start of the second search occurs after the start of the first search and before the conclusion of the first search) and ends after the first time period (e.g., the conclusion of the second search occurs after the conclusion of the first search). In embodiments, the first time period and the second time period do not overlap (e.g., the start of the second search occurs after the conclusion of the first search). In embodiments, the second time period is longer than the first time period.

In exemplary embodiments, a search space is split into at least primary and secondary subsets (e.g., a primary index and a secondary index). Although used interchangeably in various locations herein, it should be appreciated that a subset may include one or more indices. Accordingly, a primary or first subset may include a primary index, a primary index and a secondary index, or the like, a secondary or second subset may include a secondary index, a secondary or tertiary index, or the like, etc. When a query is presented, a search engine searches the primary subset (primary index) and presents the user with results. This takes a relatively short period of time (e.g., less than a second). Those results might suffice for the user. If not, the user selects a user interface (e.g., clicking an icon such as a "deep dive" icon) causing the search engine to search the secondary subset (secondary index) with the same query and present the user with those results. Although an exemplary "deep dive" icon is referred to herein, it should be understood that the icon or user interface may be graphically represented in any of a variety of ways without departing from the scope of the various embodiments described herein. In exemplary embodiments, the search of the secondary subset will take a longer period of time (e.g., 2-3 or more seconds).

In exemplary embodiments, the primary subset (e.g., primary index) is initially created by an admin (e.g., a user with administrative privileges) manually selecting a subset of the available search space. However, in other embodiments, and as will be described in greater detail herein, the primary subset is created or updated by the system (e.g., using a bot, an API, or artificial intelligence). In some embodiments, everything else relevant (e.g., the remainder of the search space) would be in the secondary subset (e.g., secondary index) by default. In some exemplary embodiments, the primary subset (e.g., primary index) is initially created by an admin (such as a user with admin privileges) manually selecting a subset of available catalogs, for example, catalog entries describing goods actually in inventory. In some embodiments, the remaining catalogs are in the secondary subset (e.g., secondary index) by default.

In exemplary embodiments, over time, the primary subset (primary index) is automatically increased in size to include items from the secondary subset (secondary index) that were not manually selected by the admin, but fit some criterion, for example: (a) goods not in inventory, but actually purchased above a threshold (e.g., 10 purchases per week or purchased by 10 or more business units per month), and/or (b) goods not in inventory, but people buy 50% of the products from this company so the whole company catalog is added, and/or (c) items manually selected by users after a deep dive search that includes the secondary subset (secondary index). A bot, an API call, or another artificial intelligence technique may be used to automatically increase the size of the primary subset.

For example, a hospital system has 8 million catalog items available to search and purchase on their system, but only 300,000 of those items are in inventory. Searches of all 8,000,000 items take 2-3 seconds, which feels too long to users. To reduce the search period, the 300,000 items in inventory are put in a primary subset (primary index), which is the only search space that is initially searched when a query is made. A search of the primary subset search space take less than a second. The remaining 7,700,000 products are put in a secondary subset (secondary index). Over time, as purchases are made, the system automatically moves items from the secondary subset (secondary index) to the primary subset (primary index) that fit some criterion, see (a)-(b), above. As another example, if a certain percentage (e.g., 25%) of the XYZ Corp. catalog is in inventory and another percentage (e.g., 50%) of the XYZ Corp. catalog is being purchased regularly, some exemplary systems will automatically add the entire XYZ Corp. catalog to the primary subset (primary index).

Referring now to the drawings, which are for purposes of illustrating exemplary embodiments of the subject matter herein only and not for limiting the same, FIG. 1 is an exemplary flow chart showing some of the principles of the present application. With reference now to FIG. 1, a method 10 for searching a search space is provided. It should be appreciated that the steps of the method 10 may be performed in a different order, with illustrated steps omitted, with additional steps added, or with a combination of reordered, combined, omitted, or additional steps.

Figure 2:
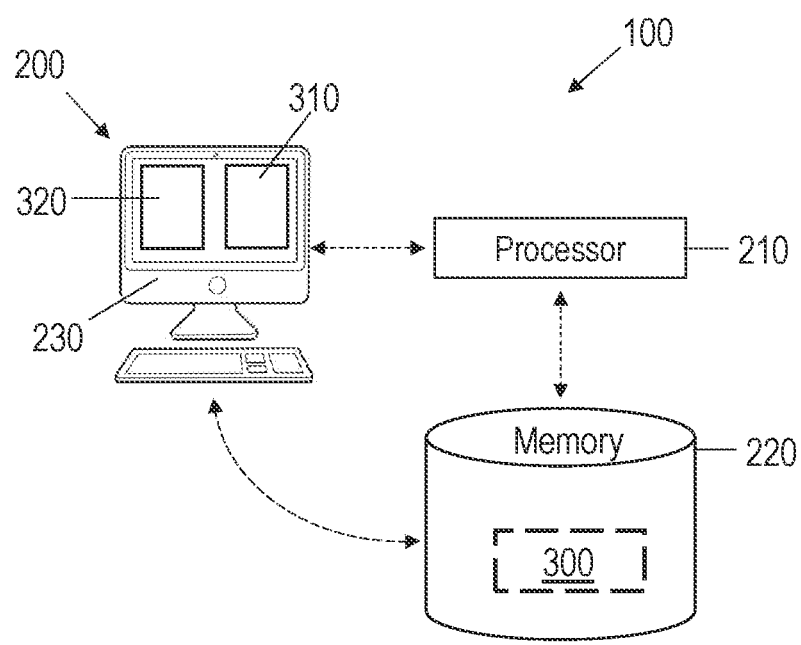
FIG. 2 illustrates an exemplary embodiment of a system for searching a search space in accordance with one or more embodiments shown and described herein.

In step 11, a search command from a user is received, for example, via the search user interface (SUI) 320 (FIG. 2). The search command includes a search query.

In step 12, a first search based on the user query is performed. In this step, for example, a first subset (or first index) of the search space is searched based on the user query.

In step 13, the search results from the first search are presented to the user. The search results are presented to the user, for example, via the SUI 320. In this step, the user may select an item from the search results and/or select, for example, a search icon to perform a second, supplemental search.

In step 14, and upon the user selecting the search icon, a second, supplemental search command is received. In step 15, and responsive to the second, supplemental search command, a second, supplemental search is performed. In embodiments, the second, supplemental search includes a search of only the second subset (second index). It should be appreciated that, in some exemplary embodiments, the second, supplemental search includes a search of any remaining subsets (or indices) of the search space.

In step 16, a second set of results from the second, supplemental search is presented to the user. In some embodiments, the second set of results includes only those items/services identified from the search of the second subset (second index). Additionally, or alternatively, the second set of results includes one or more of the results from the first search (e.g., results that are most relevant to the search query and/or any additional criteria). In some embodiments, to combine the results, the second set of results is merged with the cached first (primary) set of results and presented to the user. In some embodiments, the combined set of results is sorted by relevance to the search query and/or additional criteria. It should be appreciated that the second set of results is presented to the user via the SUI 320. In this step, the user may select any of the results presented, or in further exemplary embodiments, initiate another search command.

FIG. 2 shows an exemplary embodiment of a system 100 for indexing and searching a search space. The system 100 can be used, for example, to execute any one or more of the methods described herein. In some embodiments, as illustrated in FIG. 2, the system 100 includes one or more computers 200. The computer 200 may be an administrator device, such as a server, or in some embodiments, a user (searcher) device, such as a mobile device, workstation, or other device known in the art for processing search requests. All of the servers and the computers of users, admins, etc. have logic configured to perform the various functions and processes described herein. The computer 200 is in operable communication with a processing circuit (also referred to as processor) 210. The processor 210 is in signal communication with a memory 220 for executing programming logic (e.g., a searching programming logic (SPL) 300) stored on the memory 220.

"Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), etc. "Logic," synonymous with "circuit" as used herein includes, but is not limited to, hardware, firmware, software and/or combinations of each to perform one or more functions or actions. For example, based on a desired application or needs, logic includes a software controlled processor, discrete logic such as an application specific integrated circuit (ASIC), programmed logic device, or other processor. Logic may also be fully embodied as software. "Software," synonymous with "module" as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries. Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. The servers and computers for users, admins, etc. each have a memory that includes one or more non-transitory computer readable media of one or more local or remote data storage devices. As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium (e.g., fixed disks in external hard drives, fixed disks in internal hard drives, and flexible disks), an optical medium e.g., CD or DVD), and other media (e.g., ROM, PROM, EPROM, EEPROM, flash PROM, external flash memory drives, so-called thumb drives, etc.). Such memory can be local with respect to the computer or remote, e.g., accessed via remote server, such as a cloud server.

With continued reference to FIG. 2, in some embodiments, the SPL 300 includes a plurality of instructions or modules that, when executed by the processor 210, cause the system 100 to receive or otherwise identify a user search query, process the user search query, and deliver or otherwise display physical views of processed data via a user interface. In embodiments where the user is an administrator, for example, the user interface is an administrator user interface (AUI) 310. If the user is a searcher, for example, a SUI 320 is provided.

Figure 3:
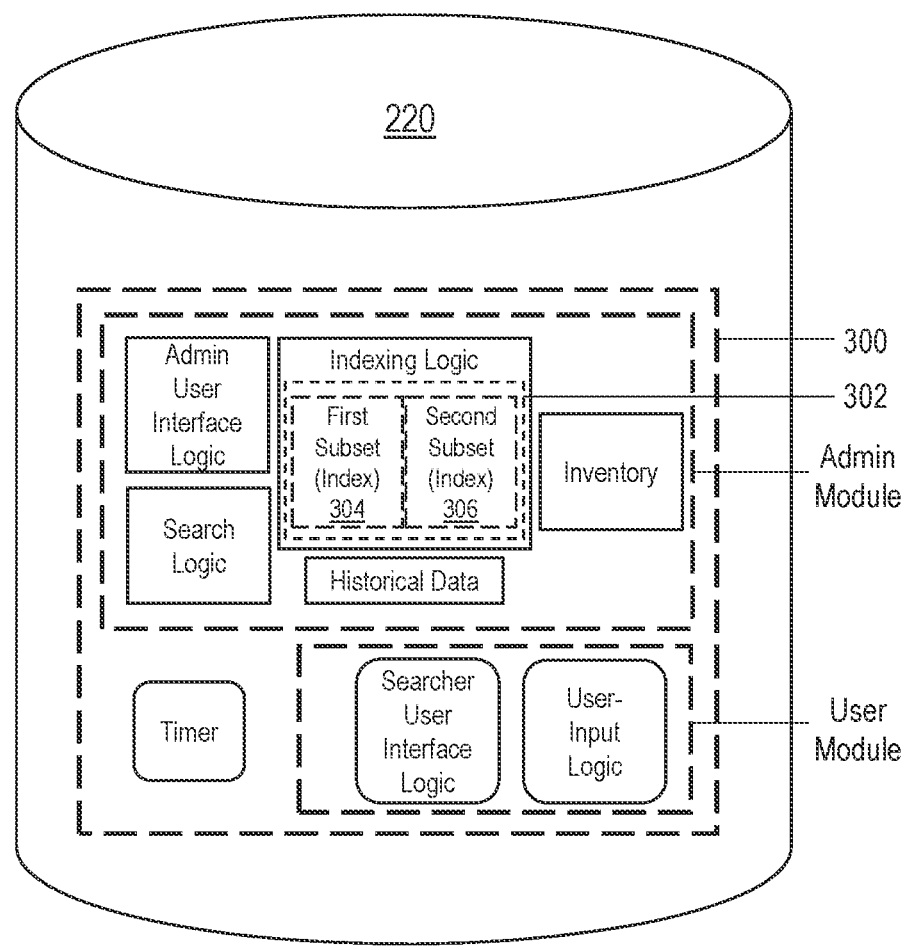
FIG. 3 is a schematic block diagram of an exemplary memory of the system of FIG. 2.

In some embodiments, the AUI 310 and/or the SUI 320 is generated or otherwise provided to the user by the SPL 300 (e.g., via the AUI logic and SUI logic, as shown in FIG. 3). Additionally, or alternatively, the AUI 310 and/or the SUI 320 is generated or otherwise provided by one or more applications of the computer 200.

With reference now to FIG. 3, the SPL 300 includes an admin module, which includes a first set of programmable logic specific to an administrator's role. For example, in some embodiments, the admin module includes instructions for creating or otherwise populating one or more subsets or indices from a search space 302 (e.g., a first subset 304 of selected items and a second subset 306 including the remaining items in the search space not selected for the first subset 304) via indexing logic.

Additionally, or alternatively, the SPL 300 includes a user (searcher) module, which is a second set of programmable logic that is specific to a searcher's role. For example, in some embodiments, the searcher module includes instructions for receiving or otherwise identifying a user search query (e.g., via user-input logic), and for searching the search space or one or more subsets of the search space based on the user search query (e.g., via search logic).

In some embodiments, the search space includes information corresponding to various types of goods and/or services (also referred to herein as "items"). The various items may be offered by a specific company, its competitors, its vendors and/or others within a specific market. For example, the items are inventory used by a hospital or provided via the health care markets (e.g., medical devices, equipment, and/or medication).

Additionally, or alternatively, the search space includes historical data. In embodiments, the historical data includes, among other things, order information (e.g., placed and/or pending orders, prices, quantities, etc.), manufacturer information, vendor information, and/or market trends for particular items or offerings within the search space, or that may be included in the search space.

In operation, the SPL 300 (or indexing logic) includes instructions for identifying an item or subset of items selected by the administrator (e.g., via the AUI 310) for assigning to or otherwise populating a first index 304 of the search space 302.

In some embodiments, items that are not selected by the administrator are included in or assigned to a second index 306. Additionally, or alternatively, the administrator creates and/or populates each subset of the search space by assigning or designating an item to a particular subset or index.

In some embodiments, the first index 304 is populated with items based on historical data. For example, one or more items that were not selected by the administrator when populating the first index is included in the first index in a subsequent search (e.g., with a new search query) if that item was previously purchased by this user or a different user at this organization or p selected by a searcher (user) at this organization when viewing supplemental search results. As another example, items currently in stock are added into the first subset, items (whether or not in inventory) that are purchased above a predetermined threshold (e.g., ten or more purchases in a week or month within an organization) are added into the first subset, or a product catalog for a company from which items are frequently purchased are added into the first subset. In some exemplary embodiments, the first index 304 and second index 306 are created and maintained within a single organization (including, e.g., affiliate organizations). In other exemplary embodiments, the first index 304 and second index 306 are created and maintained across different organizations, with the different organizations sharing creation, management or, and/or access to the search space subsets 304, 306.

In some embodiments, an admin with access to the historical data manually adds the historical data when populating the first index. Additionally, or alternatively, the process of including historical data with the first index is automated (e.g., in real-time or near real-time) upon the occurrence of an event involving an item, for example, the sale of an item, or as described, a user selecting an item from the results of a supplemental search.

With continued reference to the figures, in operation, the SPL 300 includes instructions to receive or otherwise identify a search command from the searcher (e.g., via the user-input logic). The search command includes searcher's search query.

The SPL 300 also includes instructions to search the first index based on the search query to identify any items that are relevant to the searcher's search query.

Upon identifying one or more items that are relevant to the search query, the SPL 300 includes instructions to present to the searcher (e.g., via the SUI 320) the search results from the search of the first index.

The searcher may then select an item from the search results, or if the item being sought is not included in the search result, execute a second, supplemental search command to search, for example, using the same search query, one or more remaining indices of the search space that have not been searched.

In some embodiments, the searcher executes the second, supplemental search command by selecting an icon (e.g., a search icon or similar indicia) provided by or via the SUI 320 for searching the search space.

Additionally, or alternatively, if a predetermined time period has passed and an item has not been selected, the SPL 300 includes instructions to execute the second, supplemental search upon expiry of the predetermined timer period. It should be appreciated that manually or automatically executing the second, supplemental search command initiates a subsequent search using the same search query and does not change the search query that was used for searching the first index.

In some embodiments, for example, when the searcher selects the search icon, the SPL 300 includes instructions to identify the second, supplemental search command, and to perform the second, supplemental search of the second index of the search space in response to the second, supplemental search command. It should be appreciated that the second, supplemental search being performed is based on the same search query used to perform the search of the first index.

Figure 9:
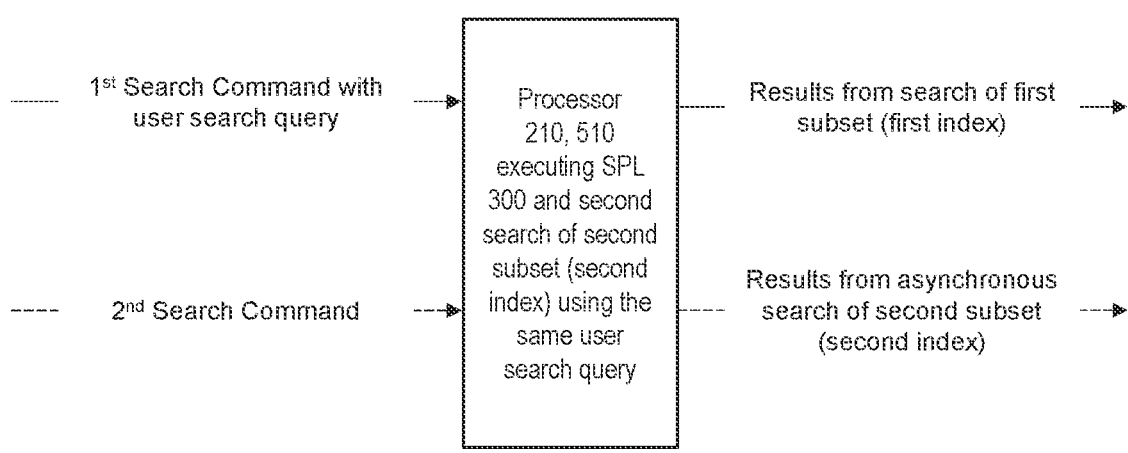
FIG. 9 is a second schematic flow diagram showing various inputs and outputs for the exemplary processors of FIGS. 2, 6, and 7.
Figure 10:
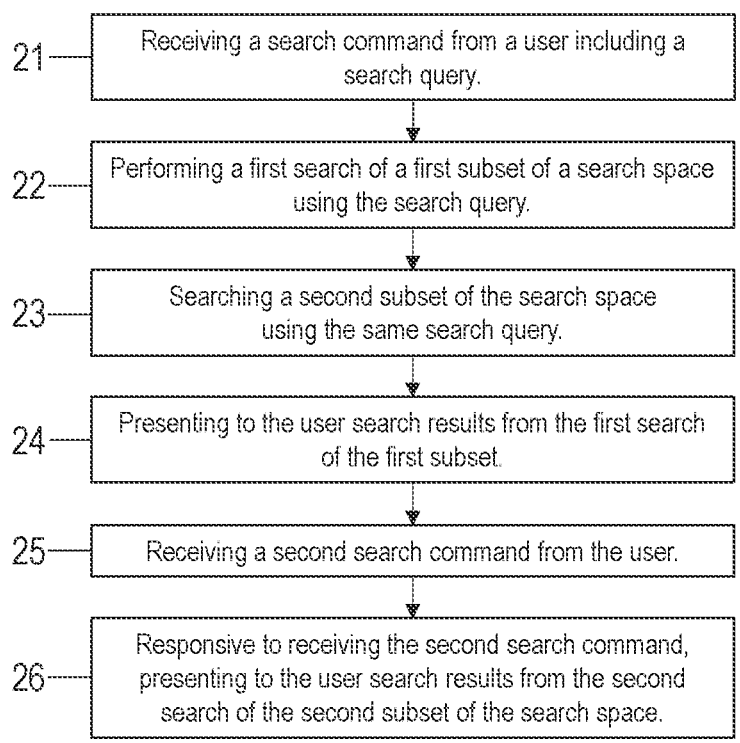
FIG. 10 illustrates a second flowchart for an exemplary embodiment of a method of searching a search space in accordance with one or more embodiments shown and described herein.
Figure 11:
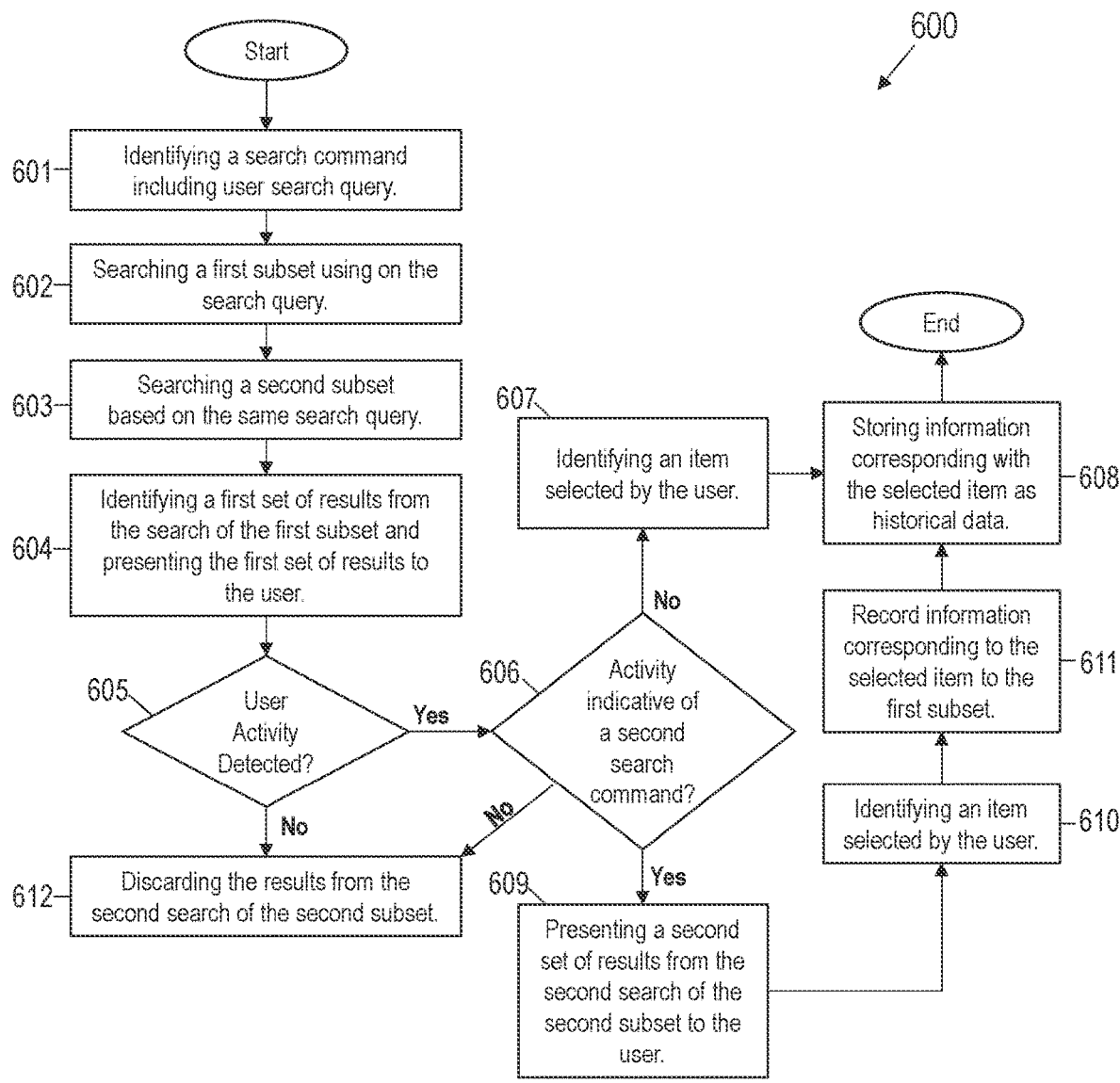
FIG. 11 illustrates a second exemplary embodiment of a process for searching a search space in accordance with one or more embodiments shown and described herein.

In some exemplary embodiments, as shown in FIGS. 9-11, the second, supplemental search is performed or at least initiated prior to the searcher selecting the search or deep dive icon (e.g., prior to the system receiving a user input indicative of a request for the second, supplemental search). For example, the second, supplemental search is executed asynchronously with respect to the first (primary) search and during execution of the first (primary) search (e.g., the second, supplemental search is initiated after the start of the first search and before the conclusion of the first search). In some embodiments, the second, supplemental search is executed asynchronously with respect to the first (primary) search and during or after presentation of the first set of search results to the user (e.g., the second, supplemental search is initiated after the conclusion of the first search, and the results of the first search are presented to the user prior to or during the second, supplemental search).

It should be appreciated that, in embodiments where the second search is asynchronous with respect to the first (primary) search and automatically initiated, selection of the search icon confirms if the second, supplemental search was performed and completed in the background rather than initiating a search of any remaining subsets (e.g., the second subset) using the same search query. In other words, the second search is initiated without user input and, upon receipt of a user input indicative that a second search is requested, the system can confirm whether the second, supplemental search has been completed. Accordingly, the user perceives that the second, supplemental search takes a relatively short time to complete as compared to the actual time to complete the second search, since the time between the user selection of the search icon and the presentation of the results is reduced compared to conventional search methods.

If completion of the second, supplemental search is confirmed, then the request to perform an additional search (e.g., the second, supplemental search request) is blocked, and the results from the second, supplemental search are presented to the user. If the second, supplemental search was not performed (e.g., the second search has not been initiated), then the second, supplemental search request is executed, and a second, supplemental search of the second index based on the same search query performed.

If the second, supplemental search has been initiated but has not been completed (e.g., is currently in process), in some embodiments, any results from the second, supplemental search that are identifiable upon selection of the search icon are presented to the searcher, or alternatively, the results are presented to the searcher upon completion of the second, supplemental search.

The SPL 300 also includes instructions to present a second set of search results from the second, supplemental search to the user, for example, via the SUI 320. The searcher may then select an item from the second set of search results.

The SPL 300 includes instructions to identify any items selected by the searcher from the second set of search results, and to record information corresponding to the selected item (e.g., indexing data) to the first index.

In some embodiments, the SPL 300 includes instructions to transfer the indexing data from, for example, the second index, to the first index. This indexing data is removed from the second index upon successful transfer to the first index.

In some embodiments, the SPL 300 includes instructions to store information associated with the searcher's selection(s) as historical data, which is subsequently added to the first index in real-time or near real-time.

In another exemplary embodiment, the SPL 300 includes instructions to identify additional criteria (e.g., a search filter) selected by the searcher, for example, via the SUI 320.

In some embodiments, and responsive to identifying any additional criteria selected by the searcher, the SPL 300 includes instructions to apply the additional criteria to any of the search results presented to the searcher.

It should be appreciated that when performing the second, supplemental search using additional criteria, the additional criteria only modifies the results that are presented to the searcher (e.g., the quantity of results presented) and not the search query used for performing a search of the first index. In other words, the additional criteria are used as a filter to modify the quantity of results presented to the user, thereby improving the likelihood that a desirable result will be readily identified by the user.

In some embodiments, the additional criteria available to the search for selection correspond to information included in the historical data, and selecting one or more of the additional criteria filters or modifies the search results based on the historical data. For example, the additional criteria are used to change the number of search results presented based on availability, market trends, price, manufacture, ratings, etc.

In some embodiments, the additional criteria are applied to the search results while the results are being populated. Additionally, or alternatively, the additional criteria are applied to the results as they are delivered to the searcher.

Figure 4:
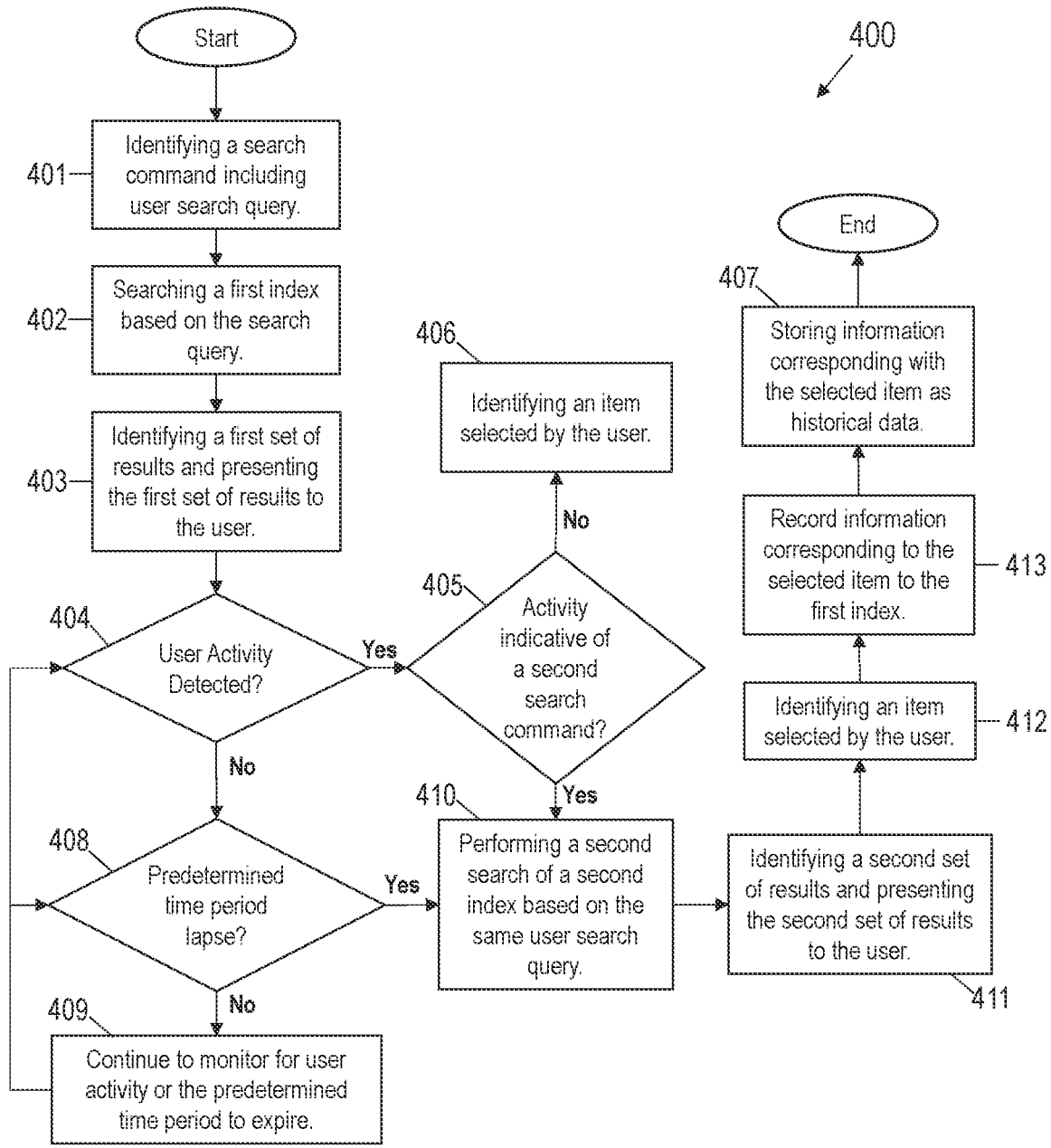
FIG. 4 illustrates an exemplary embodiment of a process for searching a search space in accordance with one or more embodiments shown and described herein.

With reference now to FIG. 4, an exemplary process 400 for searching a search space and updating one or more subsets and/or indices is provided.

In some embodiments, the process begins once a search command that includes a user search inquiry is identified (block 401). Based on the search inquiry, a search of a first index is performed (block 402) to identify results that may be relevant to the user. It should be appreciated that, because the first index is a subset of information available via the search space, a search duration of the first index is less than a search duration of the complete search space and/or any other indices of the search space.

Upon searching the first index, a first set of results are identified and presented to the user (block 403). In exemplary embodiments, the first set of results is presented to the user along with a message confirming that a subset of the full data set was searched (with or without an indication that this was done to reduce search time) and inviting the user to initiate a second, subsequent search of the full data set using the same query (with or without an indication that this will take longer than the first search). The process 400 continues to a decision block in which detection of user activity is attempted (block 404).

If user activity is detected (e.g., a "yes" at block 404), the process includes determining whether the user activity is indicative of a second search command (block 405). For example, the user may select an item from the first set of results, e.g., to put the item in a cart or basket for later purchase or PO generation, or the user may request a second, supplemental search. In some embodiments, for example, where an item is selected from the first set of results (e.g., a "no" at block 405), the item selected by the user is identified (block 406) and information corresponding to the selected item is stored as historical data (block 407). It should be appreciated that the historical data may be used to populate one or more subsets of the search space.

Alternatively, if no items are selected from the first set of search results, the user requests a second, supplemental search be performed. This can be accomplished in a variety of ways. For example, if user activity is not detected (e.g., a "no" at block 404), the process determines whether a predetermined time period has lapsed (block 408). If the predetermined time period has not lapsed (e.g., a "no" at block 408), the process continues to monitor for user activity (block 409), returning to block 404. The monitoring loop repeats until the expiration of the predetermined time period (e.g., a "yes" at block 408), at which point the process proceeds to perform the second, supplemental search (block 410).

In some embodiments, to commission the second, supplemental search, the user selects a user interface such as an icon or link indicative of a search request, e.g., clicking an icon that reads "Deep Dive" (e.g., a "yes" at block 405). In exemplary embodiments, the user indicates whether the second search is to be done with or without the first subset in the search space (e.g., the user may desire to search the first subset for a second time based on the same search query plus additional criteria). Additionally, or alternatively, the second, supplemental search begins after a predetermined time period has lapsed and no items have been selected by the user from the first set of search results.

Upon identifying the second, supplemental search command from the user (or upon expiry of the predetermined time period), a second, supplemental search is performed (block 410).

In some embodiments, the second, supplemental search is based on the same search query used for performing the first search.

Additionally, or alternatively, the second, supplemental search is based on the same search query and additional criteria. In some embodiments, the additional criteria are used to modify (e.g., reduce) the number of results returned from the search (e.g., filter), rather than modifying the search query. For example, the additional criteria may be indicative of a desired price range, a product manufacture, a production date, etc.

The second, supplemental search searches exclusively the second index (e.g., not the first index). However, it should be appreciated that the second, supplemental search searches exclusively any remaining indices that were not included in the first search (e.g., a second and/or third or more indices). In other words, the second, supplemental search searches one or more indices remaining in the search space less the first index.

Upon performing the second, supplemental search, a second set of search results is identified and presented to the user (block 411). If the second set of search results includes an item that the user desires, the user may select the item (block 412), e.g., to put the item in a cart or basket for later purchase or PO generation.

Once the item is selected, information corresponding to the selected item (e.g., indexing data) is recorded to the first index, or in some embodiments, transferred to the first index from, for example, the second index (block 413). In some embodiments, the information corresponding to the selected item is stored or otherwise saved as historical data (block 407).

Figure 5:
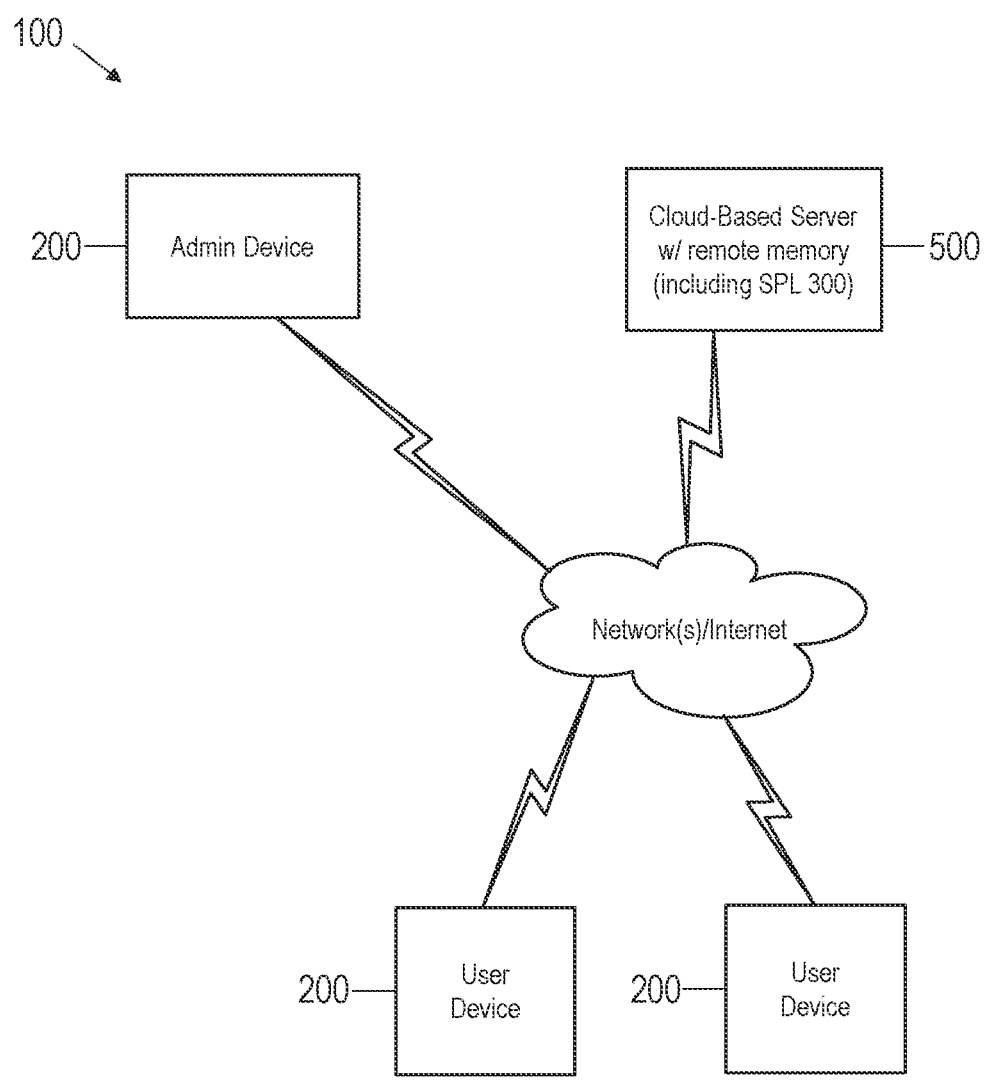
FIG. 5 illustrates another exemplary embodiment of a system for searching a search space in accordance with one or more embodiments shown and described herein.

With reference to FIG. 5, in some embodiments, the system 100 is cloud-based system that includes one or more cloud-based devices accessible to one or more users and/or admins via the internet or similar network. For example, in some embodiments, the cloud-based system 100 includes a cloud-based server 500 with the SPL 300 (FIG. 3) stored in a memory or similar storage medium thereon. The computer 200 for one or more of the users and/or admins accesses the SPL 300 stored on the cloud-based server 500 via the internet when executing a search command from the user's device and/or to populate the subsets (e.g., the first subset) from the admin's device.

Figure 6:
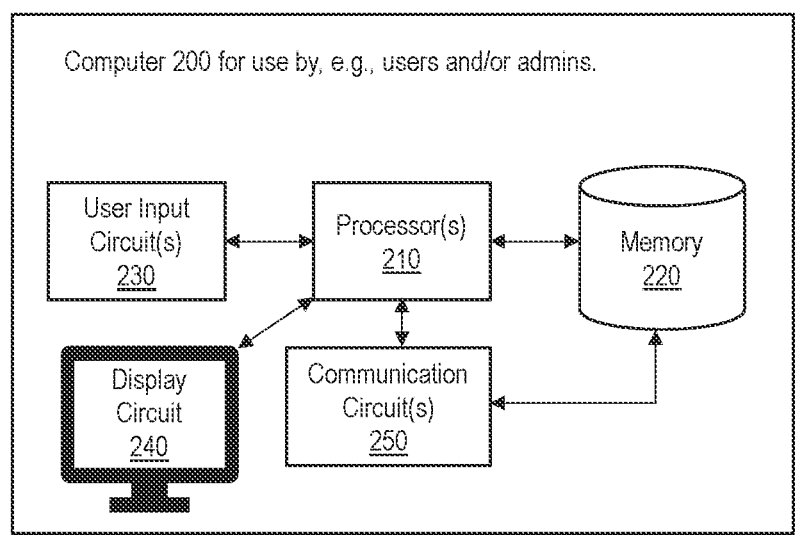
FIG. 6 is a schematic block diagram of an exemplary computer in accordance with one or more embodiments shown and described herein.

With reference now to FIG. 6, a schematic block diagram of an exemplary computer 200 for use by various users and/or admins of the various systems and methods herein is shown. In some embodiments, the computer 200 includes one or more processing circuits (e.g., processor 210) in communication with a memory circuit (e.g., memory 220), one or more user input circuits 230, a display circuit 240, and one or more communication circuits 250. The memory 220 includes one or more non-transitory computer readable media of one or more data storage devices. In the context of a handheld computer, this memory circuit might include flash memory and/or RAM and/or ROM memories. In the context of a desktop or laptop computer, this memory circuit might include one or more fixed disk drives and/or RAM and/or ROM memories. The memory 220 will have stored thereon logic modules for performing the various functions and processes described herein or a program to access such logic modules from a remote memory, such as the server memory 520 of FIG. 7 (e.g., a browser program to access such logic modules from the server memory 520).

The user input circuits 230 includes any one or more of buttons, keyboards, keys, touchpads, touchscreens, and associated support chips, and/or one or more communication circuits (e.g., RS-232 or USB) for an external keyboard or other external user input device, such as a mouse, track pad, or other pointing device, or other user input devices.

The display circuit 240 includes any one or more of LEDs, N×M textual displays, matrix displays on which a graphical user interface ("GUI") can be presented, e.g., a color or monochrome liquid crystal display ("LCD") or organic light-emitting diode ("OLED") display, with associated drive chips, and/or one or more graphics circuits (e.g., VGA or HDMI) for an external display, or other displays.

The communication circuits 250 include antennas and/or data ports and driver chips for sending and receiving communications with devices external to the computer 200. The communication circuits 250 can include any one or more of WiFi antennas and circuitry, LTE antennas and circuitry, GPS antennas and circuitry, CDPD antennas and circuitry, GPRS antennas and circuitry, GSM antennas and circuitry, UMTS antennas and circuitry, and other antennas and circuitry, USB ports and circuitry (e.g., standard, micro, mini, etc.), RS-232 ports and circuitry, proprietary ports and circuitry (e.g., APPLE 30 pin and Lightning ports), RFID antennas and circuitry, NFC antennas and circuitry, bump technology antennas and circuitry, a Bluetooth antenna and circuitry, and other antennas, ports, and circuitry.

Figure 7:
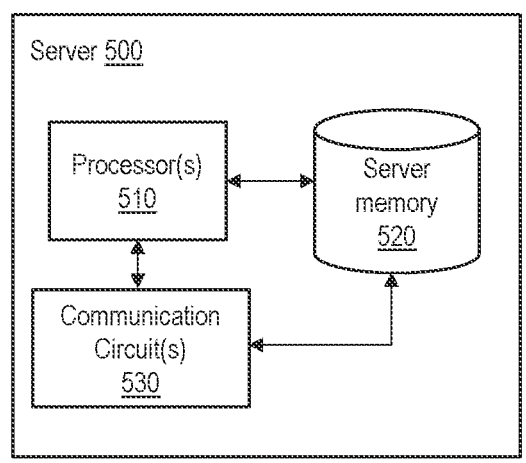
FIG. 7 is a high-level block diagram of an exemplary server in accordance with one or more embodiments shown and described herein.

FIG. 7 is a high-level block diagram of an exemplary server 500 (FIG. 5). The server 500 includes one or more processors 510 in communication with a server memory 520 and one or more communication circuits 530. The server memory 520 includes one or more non-transitory computer readable media of one or more local or remote data storage devices. Data for the various functions and processes described herein can be stored on the server memory 520 permitting that data to be accessed by the computers 200 of users and/or admins using the communication circuits 530. The software used by the computers 200 of users and/or admins perform the various functions and processes herein can be stored on one or more data storage devices local to the computers 200 of users and/or admins or it can be downloaded or otherwise accessed from the server memory 520, or some combination of both. Thus, the server memory 520 can also be used to store software (e.g., SPL 300) for use by some of the computers 200 of users and/or admins to perform the various functions and processes described herein. For example, the computers 200 of users and/or admins can use a browser to access web-based software or other remote software hosted by the server 500. The communication circuits 530 can include any suitable bus interface circuits for communicating with the computers 200 over wired or wireless communication media (e.g., radio frequency or optical communication media).

Figure 8:
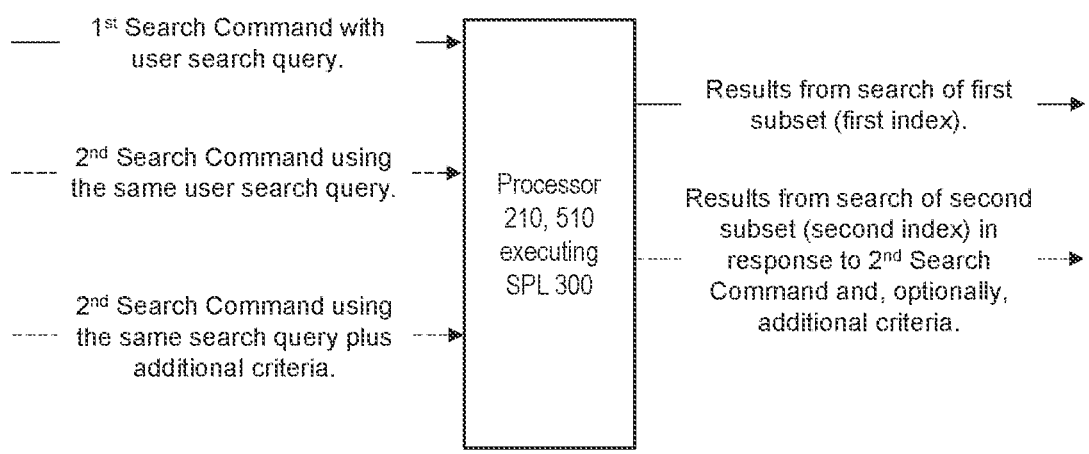
FIG. 8 is a schematic flow diagram showing various inputs and outputs for the exemplary processors of FIGS. 2, 6, and 7.

Referring now to FIG. 8, various inputs and outputs for the various processors for FIGS. 2, 6, and 7 are shown. As shown in FIG. 8, one or more of the processors 210, 510, etc. accept as inputs a user search query for searching one or more subsets (indices) of a search space 302 (e.g., the first subset 304 and/or the second subset 306). The user search query is entered by a user, e.g., via the SUI 320, and executed via a first search command. As shown in FIG. 8, and in response to receiving the first search command from the user, one or more of the processors 210, 510, etc. search the first subset 304 (first index) based on the user search query and generates or otherwise populates a first set of search results. If the first set of search results does not identify any items the user desires (as indicated by user activity indicative of selection of an item), and in response to a second, supplemental search command from the user, the one or more processors 210, 510, etc. search the second subset 306 (second index) based on the same user search query and, optionally, any additional criteria to generate or otherwise populate a second set of search results. It should be appreciated that the additional criteria may be provided for filtering any of the search results.

Referring now to FIG. 9, various inputs and outputs for the various processors for FIGS. 2, 6, and 7 are shown. FIG. 9 is similar to the embodiment of FIG. 8, except that in FIG. 9, the second, supplemental search is executed asynchronously with respect to the first search and during execution of the first search, rather than upon identification of a second, supplemental search command from the searcher/user. In some such embodiments, selection of the search ("Deep Dive") icon causes presentation of the results from the second, supplemental search of the second subset (second index) to the searcher.

It should be appreciated that computers typically include a variety of computer readable media that can form part of the system memory and be read by the processing unit. By way of example, and not limitation, computer readable media may comprise computer storage media and communication media. The system memory includes computer storage media in the form of volatile and/or nonvolatile memory such as read only memory (ROM) and random access memory (RAM).

A user enters commands and information into the computer through a user interface (UI) that includes input devices such as a keyboard and pointing device, commonly referred to as a mouse. Other input devices include a microphone, scanner, voice recognition device, touch screen, toggle switch, pushbutton, or the like. These and other input devices are often connected to the processing unit through a user input interface that is coupled to a system bus, but may be connected by other interface and bus structures, such as a parallel port or a universal serial bus (USB).

One or more monitors or display devices (e.g., a display 202 as shown in FIG. 2) are also be connected to the system bus via an interface. In addition to display devices, computers also include other peripheral output devices, which may be connected through an output peripheral interface. The computers implementing various embodiments described herein operate in a networked environment using logical connections to one or more remote computers, the remote computers typically include many or all of the elements described above.

Various networks may be implemented in accordance with the embodiments described herein, including a wired or wireless local area network (LAN) and a wide area network (WAN), wireless personal area network (PAN) and other types of networks. When used in a LAN networking environment, computers are connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the various embodiments described herein.

The term "module" used herein will be appreciated as comprising various configurations of computer hardware and/or software implemented to perform operations. In some embodiments, logics or modules as described are represented as instructions operable to be executed by a processor and a memory. In other embodiments, logics or modules as described are represented as instructions read or executed from a computer readable media. A logic or module is generated according to application specific parameters and/or user settings. It will be appreciated by those of skill in the art that such configurations of hardware and software vary, but remain operable in substantially similar ways.

With reference now to FIG. 10, another exemplary method 20 of searching a search space is provided. However, in contrast to exemplary method 10, in method 20, the second search is initiated prior to receiving a second search command from the user. In step 21, a search command from a user is received, for example, via the SUI 320 (FIG. 2). The search command includes a search query. In step 22, a search based on the user query is performed. In this step, for example, a first subset (or first index) of the search space is searched based on the user query. In step 23, a second, supplemental search of the second subset (or second index) is performed asynchronously with respect to the search of the first subset and during execution of the search of the first subset (first index). For example, the second search is initiated during a time period over which the first search is conducted, such that a start time of the second search occurs after a start time of the first search and before a conclusion of the first search.

In step 24, the search results from the search of the first subset (first index) are presented to the user. The search results are presented to the user, for example, via the SUI 320. In this step, the user may select an item from the search results and/or select, for example, a search icon to view additional search results (e.g., any results from the second, supplemental search of the second subset or any remaining indices). In embodiments, the steps 23 and 24 may be performed during the same period of time, or step 23 may be performed after step 24, but before step 25.

In step 25, and upon the user selecting the search icon, a request to view additional search results is received. In step 26, and responsive to receipt of the request to view additional search results, a second set of results from the second, supplemental search is presented to the user. It should be appreciated that the results from the second, supplemental search of the second subset are stored in memory (e.g., cache memory) and made available or otherwise presented to the user once the user executes a command (e.g., a second search command) to receive the additional search results. It should also be appreciated that performing the second, supplemental search shortens the perceived period for searching the second subset (e.g., the amount of time between user selection of the search icon and presentation of the additional search results) by beginning the search prior to the user initiating the second search command. In some embodiments, if the user does not choose to view any additional search results, the results from the second, supplemental search are discarded.

With reference now to FIG. 11, an exemplary process 600 for searching a search space for one or more items and updating one or more subsets and/or indices is provided.

In some embodiments, the process begins once a search command that includes a user search inquiry is identified (block 601). Based on the search inquiry, a search of a first subset is performed to identify results that may be relevant to the user (block 602). A second, supplemental search of the second subset is performed asynchronously with respect to the search of the first subset (block 603). In embodiments, the second search is initiated after the initiation of the first search and before or after the conclusion of the first search.

Upon searching the first index, a first set of results are identified and presented to the user (block 604). Although illustrated in FIG. 11 as occurring prior to block 604, it is contemplated that, in embodiments, the second search is initiated during or after presentation of the first set of results to the user (e.g., block 603 can occur before, during, or after block 604).

In exemplary embodiments, the first set of results is presented to the user along with a message confirming that a subset of the full data set was searched (with or without an indication that this was done to reduce search time) and inviting the user to review the results of the second, supplemental search based on the same query (with or without an indication that this will take longer than the first search). The process monitors the system for user activity (block 605).

If user activity is detected (e.g., a "yes" at block 605), the process determines whether the activity is indicative of a second search command (block 606). For example, the user may select an item from the first set of results, e.g., to put the item in a cart or basket for later purchase or purchase order (PO) generation (a "no" at block 606), or the user may request to review the results from the second, supplemental search (a "yes" at block 606). In some embodiments, for example, when an item is selected from the first set of results, the item selected by the user is identified (block 607) and information corresponding to the selected item are stored as historical data (block 608). It should be appreciated that the historical data is used to populate one or more subsets of the search space in some embodiments.

If no items are selected from the first set of search results, the user requests to view the results from the second, supplemental search of the second index. In some embodiments, to view the results from the second, supplemental search, the user selects an icon associated with a second search command or "Deep Dive" review.

Upon identifying the "Deep Dive" icon selection (e.g., a "yes" at block 606), the second set of search results is presented to the user (block 609). If the second set of search results includes an item that the user desires, the user selects the item, e.g., to put the item in a cart or basket for later purchase or PO generation. Once the item is selected, it is identified (block 610) and information corresponding to the selected item (e.g., indexing data) is recorded to the first subset (block 611), or in some embodiments, transferred to the first subset from, for example, the second subset. In other words, the first subset increases over time as information from the second subset is identified as being particularly relevant. In some embodiments, the information corresponding to the selected item is stored or otherwise saved as historical data (block 608).

It should be appreciated that, if the user does not select the icon to review the second set of search results or takes no action (e.g., a "no" at blocks 605 or 606), the second set of search results is discarded (block 612).

In some embodiments, searching one or more of the subsets of the search space is achieved using an Application Programming Interface (API) call. For example, a Representational State Transfer (REST or RESTful) API, or similar web service, is used to search the search space. It should be appreciated that subsequent searches, for example, the second, supplemental search, is initiated using a subsequent API call at a later time (e.g., upon selection of the Deep Dive icon, at or near a conclusion of the first search, or at another predetermined time).

Additionally, or alternatively, the search system is an autonomous search system, performed in the background, and without a user initiating any search command. For example, the search is scheduled to automatically run according to a predetermined schedule. In this exemplary embodiment for presenting the autonomous search results to the user, the SPL 300 includes instructions for monitoring one or more directories or user cache to identify a user's search history. Upon identifying the user's search history, a search query based on the user's search history is generated, and a search of the search space (or any indices of the search space) is performed based on the generated search query.

In some embodiments, the results from the autonomous search are presented to the user once the user logs into the system. Additionally, or alternatively, the results are sorted or otherwise placed into various categories and presented to the user upon identifying a user search command with user search query. In some embodiments, only those categories with results that are relevant to the user search query are presented to the user in response to the system receiving the user search command. If no category includes results that are relevant to the user search query, then responsive to receiving the user search command, a search of the search space based on the user search query is performed, for example, in accordance with one or more of the methods herein (e.g., the method 10 of FIG. 1 and/or the method 20 of FIG. 10).

In further exemplary embodiments, the autonomous search system is configured to monitor one or more directories or user cache to identify a user and/or a user's search history. In some embodiments, the autonomous search system utilizes one or more "bots" for performing tasks of the autonomous search system. For example, upon identifying the user's search history, at least one bot generates a search query based on the user's search history. In some embodiments, one or more of the bots searches the search space (or any indices of the search space) based on the generated search query via the API call. The results that are relevant to the generated search query are then presented to the user once the user logs into the system and/or upon the user submitting a search query related to one or more categories of results. It should be appreciated that although bots and API calls are specifically recited with respect to certain aspects of the methods provided herein, it is contemplated that the bots, API calls, and other artificial intelligence techniques and protocols can be used in any additional or alternative steps described, as will be apparent to one skilled in the art.

Figure 12:
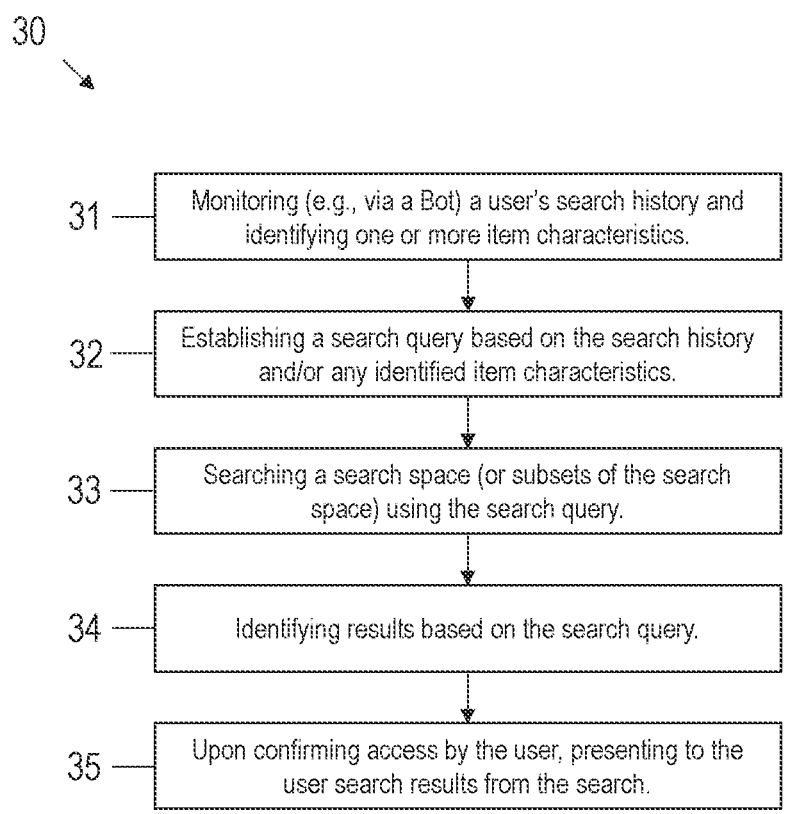
FIG. 12 illustrates a third flowchart for an exemplary embodiment of a method of searching a search space in accordance with one or more embodiments shown and described herein.

With reference now to FIG. 12, an exemplary method 30 of searching a search space and presenting search results to a user is provided. In step 31, a user's search history is monitored, e.g., using AI or one or more bots, and one or more item characteristics are identified. In some embodiments, one or more directories (and/or user search cache) are monitored or otherwise accessed and/or searched to identify the user's search history. As used herein, an "item characteristic" or a characteristic of item refers to a type of information that may be used to identify that item. For example, a characteristic of an item may be a part number or product code for that item. In some embodiments, a characteristic is a product type (e.g., gloves, shoes, etc.) or other feature used to distinguish one or more items (e.g., blue gloves, latex gloves, size 8 gloves etc.).

In step 32, a search query is established or otherwise generated based on the user's search history and any identified item characteristics. In this step, the generated search query is based on information gathered from the user's search history (e.g., the item characteristics) and used to search the search space. In some embodiments, the search query is a prior user search query that was identified during the search of the user search history. This prior search query is reused (i.e., recycled) in subsequent search of the same or a different search space. In step 33, a search space (or subset of the search space) is searched using the search query (e.g., a generated search query and/or a recycled user search query). In step 34, results based on the search query (generated or recycled) are identified.

In step 35, upon identifying and/or confirming that the user has logged in (or otherwise accessed the search system), the search results are presented to the user. The results from the search are presented to the user once the user logs into the system using their credentials. In some embodiments, the user's identity and/or other credentials are verified (or otherwise confirmed) prior to presenting the results to the user, and to confirm that the monitored user search history belongs to the user accessing the system. In some embodiments, the results are presented to the user after receiving a search command with search query from the user. Accordingly, because the search was completed prior to the user sending a search command, the results are presented to the user such that the user perceives that the time to conduct the search is a short period of time (e.g., less than 2 seconds). It should be appreciated that, in this embodiment, only those results that are relevant to the search query included in the user search command are presented to the user, with the remaining non-relevant or less relevant results being discarded or held for subsequent search queries from the same user.

Figure 13:
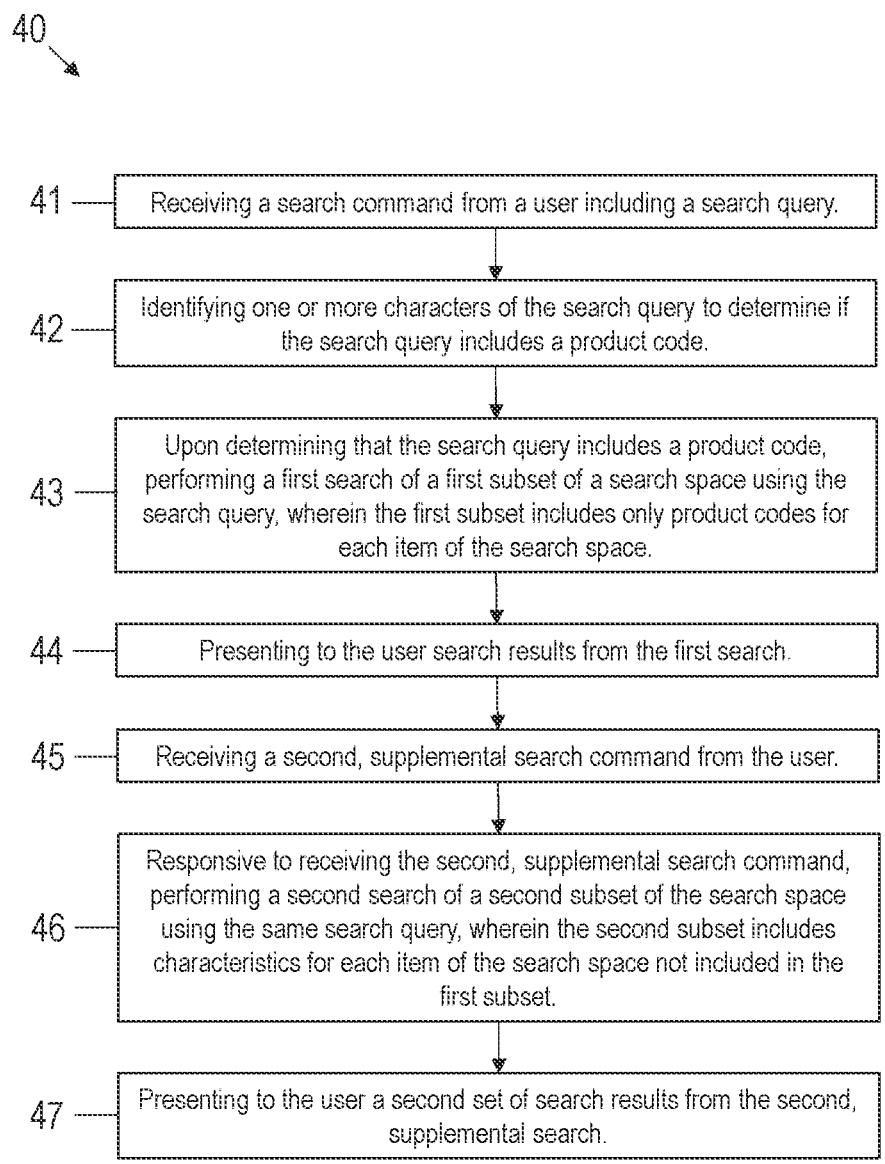
FIG. 13 illustrates a fourth flowchart for an exemplary embodiment of a method of searching a search space in accordance with one or more embodiments shown and described herein.

With reference now to FIG. 13, a further exemplary method 40 of searching a search space and presenting search results to a user is provided. In particular, in method 40, the first subset is limited to product codes and the search query from the user is analyzed to determine whether the search query includes a product code. Such methods can be useful, for example, in environments in which inventory systems are searched using an open search box (e.g., the search box can be used to send any of a variety of types of searches).

In step 41, a search command from a user is received, for example, via the SUI 320 (FIG. 2). The search command includes a search query. In step 42, one or more characters of the search query are identified to determine if the search query includes a product code. For example, the search query is analyzed and determined to include only numerical characters or a particular pattern of alphabetical and numerical characters that is characteristic of product codes included in the search space. In step 43, and upon determining that the search query includes a product code, a search based on the user search query is performed. In this step, for example, a first subset (or first index) of the search space is searched based on the user query. The first subset includes only product codes for each item of the search space. For example, the first subset is a product code column in an inventory look up table. In step 44, the search results are presented to the user. The search results are presented to the user, for example, via the SUI 320. In this step, the user may select an item from the search results and/or select, for example, a search icon to perform a second, supplemental search.

In step 45, and upon the user selecting the search icon, a second, supplemental search command is received. In step 46, and responsive to receiving the second, supplemental search command, a second, supplemental search is performed. In this step, the second, supplemental search includes a search of only the second subset (second index). In some embodiments, the second subset includes characteristics for each item of the search space that were not included in the first subset. For example, the second subset includes product type (e.g., glove, tape, mask, etc.), product colors, product sizes, etc., but will not include the item product codes included in the first subset.

In step 47, a second set of results from the second, supplemental search is presented to the user. In some embodiments, the second set of results include only those items/services identified from the search of the second subset (second index). Additionally, or alternatively, the first set of results are merged with the second set of results and sorted for the user, for example, based on relevancy to the search query. It should be appreciated that the second set of results is presented to the user via the SUI 320. The user may select any of the results presented or initiate another search command, including the same or a different search query.

Figure 14:
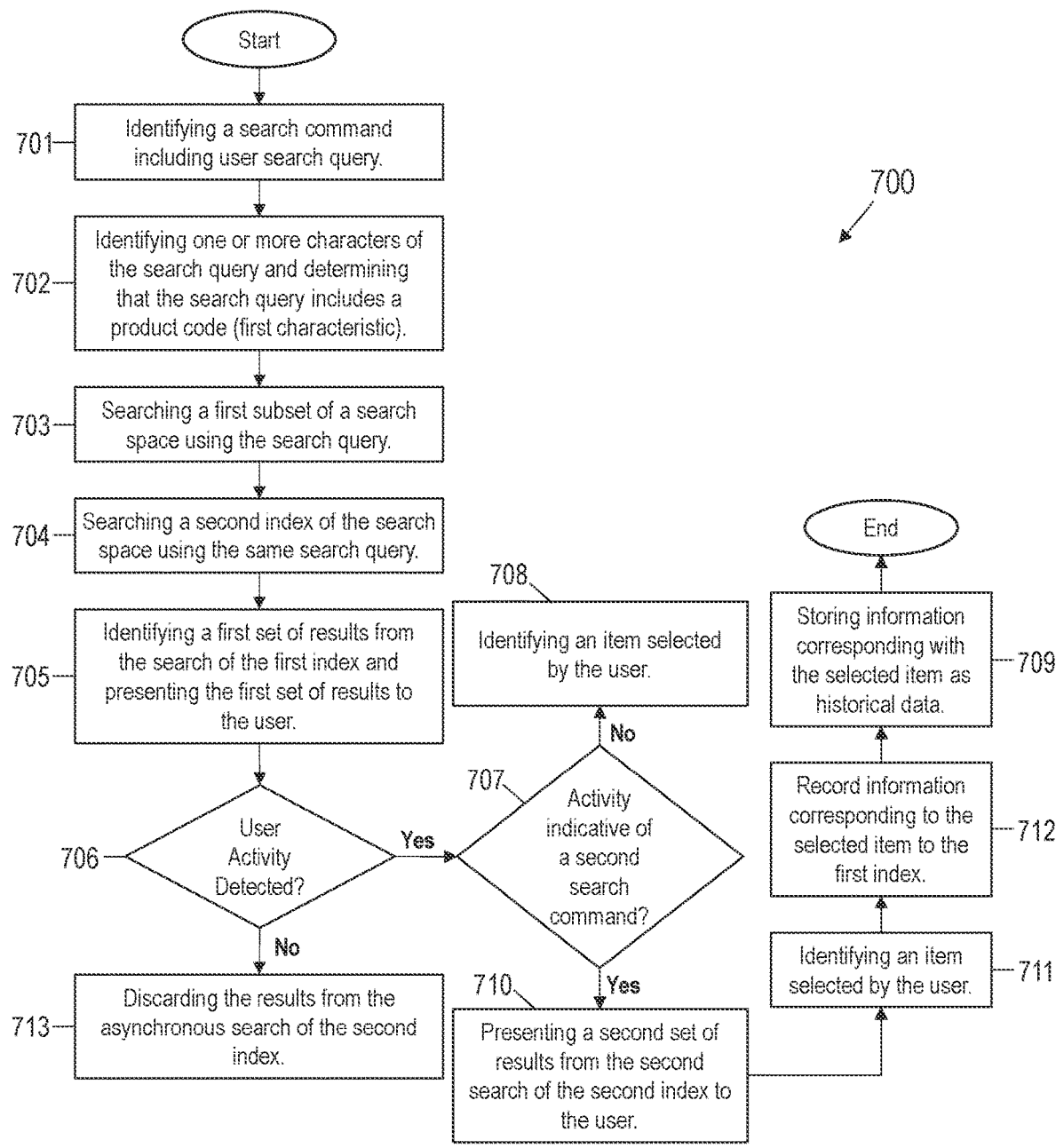
FIG. 14 illustrates a third exemplary embodiment of a process for searching a search space in accordance with one or more embodiments shown and described herein.

With reference now to FIG. 14, another exemplary process 700 for searching a search space for one or more items and updating one or more subsets and/or indices is provided. In process 700, the search query is analyzed to determine whether a product code is included, and a second, supplemental search is initiated prior to receiving a user request for a second search.

In some embodiments, the process 700 begins once a search command that includes a user search inquiry is identified (e.g., received by the system) (block 701). The search query is analyzed to determine if one or more characters of the search query are indicative of a product code (block 702). For example, the search query is analyzed to determine if the numbers or pattern of letters and numbers match product codes contained in the first index. Upon determining that the search query is or includes a product code, a search of a first index is performed to identify results that may be relevant to the user (block 703). In some embodiments, a second, supplemental search of a second index is automatically performed after initiation of the first search (block 704), and prior to the user executing a second, subsequent search command.

In some embodiments, the first index includes a first characteristic for each of the items in the search space. It should be appreciated that, in some embodiments, where the first characteristic is a product number, populating the first index with only the first characteristic for each item means populating the first index with the product numbers for each item in the search space. The second index is then populated with any remaining characteristics (e.g., product name, type, color, etc.) for each item, and not the product numbers.

Additionally, or alternatively, the first index is a product number column or field for all items in the search space, or in some embodiments a column (or field) for all items is designated as the first index. In this embodiments, a search of the first index is a search of the information in the product number column for all items in the search space, and a search of the second index is a search for information in the remaining columns (fields) for all items in the search space, excluding the product number column.

In exemplary embodiments, a first set of results from the first search is identified and presented to the user (block 705). The first set of results may be presented to the user along with a message confirming that a subset of the full data set was searched (with or without an indication that this was done to reduce search time) and inviting the user to review the results of the second, supplemental search based on the same query (with or without an indication that this will take longer than the first search). The process then monitors the system for user activity (block 706).

Responsive to detecting user activity (e.g., a "yes" at block 706), the process determines whether the activity is indicative of a second search command (block 707). For example, the user may select an item from the first set of results, e.g., to put the item in a cart or basket for later purchase or PO generation (e.g., a "no" at block 707), or the user may request to review the results from the second, supplemental search (e.g., a "yes" at block 707). In some embodiments, for example, when an item is selected from the first set of results, the selected item is identified (block 708) and information corresponding to the selected item is stored as historical data (block 709). It should be appreciated that the historical data may be used to populate one or more subsets of the search space.

Alternatively, the user may request to view the results from the second, supplemental search of the second index. In some embodiments, to view the results from the second, supplemental search, the user selects an icon associated with a second search command or "Deep Dive" review.

Upon receiving an indication that the "Deep Dive" icon has been selected (e.g., a "yes" at block 707), the second set of search results is presented to the user (block 710). If the second set of search results includes an item that the user desires, the user selects the item, e.g., to put the item in a cart or basket for later purchase or PO generation. Once the item is selected, the item is identified (block 711) and information corresponding to the selected item (e.g., indexing data) is recorded to the first index (block 712), or in some embodiments, transferred to the first index from, for example, the second index. In some embodiments, the information corresponding to the selected item is stored or otherwise saved as historical data (block 709). It should be appreciated that, if the user does not select the icon to review the second set of search results (e.g., a "no" at block 707) and/or the system does not detect any user activity at block 706 after a predetermined period of time, the second set of search results is discarded (block 713).

Although described with reference to a first search of a first subset or index and a second search of a second subset or index, in embodiments, searches subsequent to the first search may be broken up into one or more searches of corresponding subsets or indices. For example, the first search is a search of product numbers (e.g., the first subset includes product numbers), a second search includes a search of items corresponding to the product numbers in the first subset (e.g., the second subset includes a search of items corresponding the product numbers from the first subset), and a third search includes a search of the remaining search space (e.g., the third subset includes items that did not have product numbers or were otherwise not included in the first or second subsets).

Figure 15:
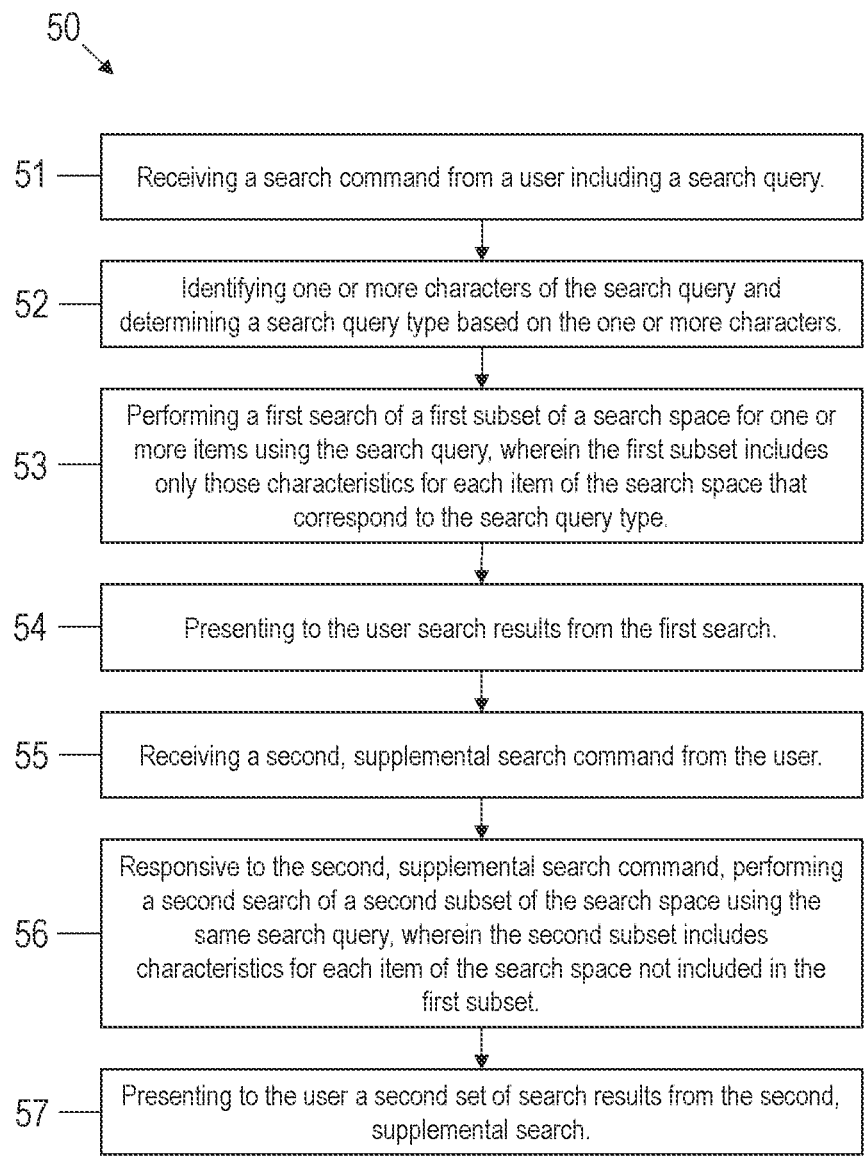
FIG. 15 illustrates a fifth flowchart for an exemplary embodiment of a method of searching a search space in accordance with one or more embodiments shown and described herein.

With reference now to FIG. 15, another exemplary method 50 of searching a search space and presenting search results to a user is provided. In method 50, the search query is analyzed to determine a type of query, and a second, supplemental search is initiated responsive to receiving a user request for a second search.

In step 51, a search command from a user is received, for example, via the SUI 320 (FIG. 2). The search command includes a search query. In step 52, one or more characters of the search query are identified and a search query type is determined based on the one or more characters. For example, the search query is analyzed to determine whether it includes a pattern of characters indicative of a product code or another type of search. In step 53, a first search of a first subset of a search space for one or more items is performed using the search query, wherein the first subset includes only those characteristics for each item of the search space that correspond to the search query type. In this step, for example, if the search query type is a product code, the first subset includes only product codes for each item of the search space. In step 54, the search results are presented to the user. The search results are presented to the user, for example, via the SUI 320. In this step, the user may select an item from the search results and/or select, for example, a search icon to perform a second, supplemental search.

In step 55, and upon the user selecting the search icon, a second, supplemental search command is received. In step 56, and responsive to the second, supplemental search command, a second, supplemental search is performed. In this step, the second, supplemental search includes a search of only the second subset. In some embodiments, the second subset includes characteristics for each item of the search space that were not included in the first subset. For example, the second subset includes product type (e.g., glove, tape, mask, etc.), product colors, product sizes, etc., but will not include the item product codes included in the first subset. In step 57, a second set of results from the second, supplemental search is presented to the user.

Although described with reference to a first search of a first subset and a second search of a second subset, in embodiments, searches subsequent to the first search may be broken up into one or more searches of corresponding subsets or indices. For example, the first search is a search of product numbers (e.g., the first index includes product numbers), a second search includes a search of items corresponding to the product numbers in the first index (e.g., the second index includes a search of items corresponding the product numbers from the first index), and a third search includes a search of the remaining search space (e.g., the third index includes items that did not have product numbers or were otherwise not included in the first or second indices).

Figure 16:
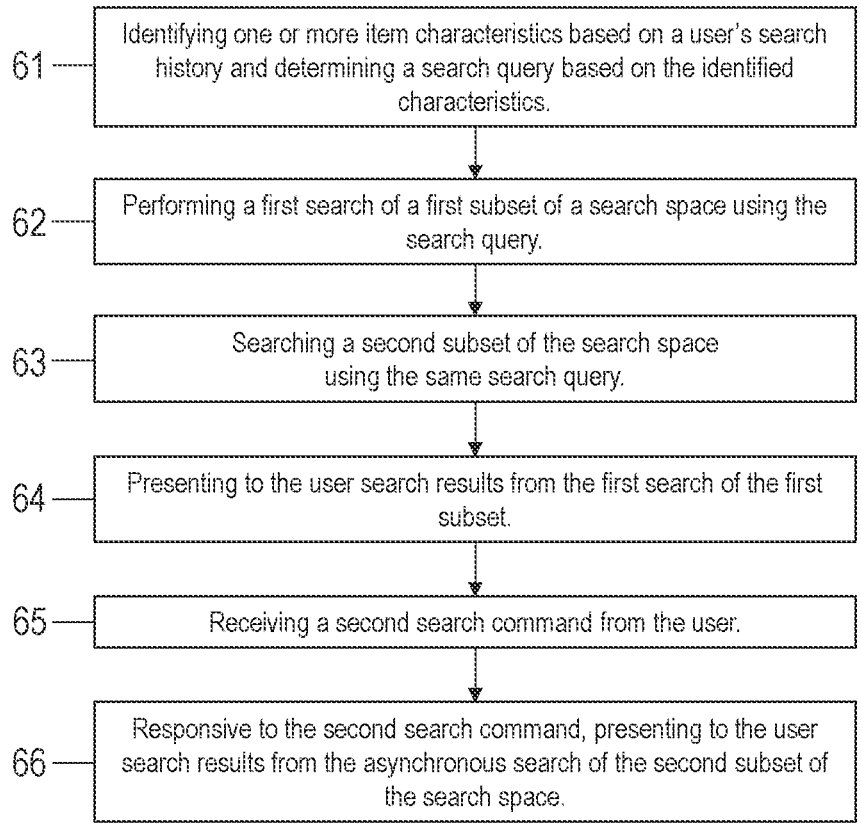
FIG. 16 illustrates a sixth flowchart for an exemplary embodiment of a method of searching a search space in accordance with one or more embodiments shown and described herein.

With reference now to FIG. 16, another exemplary method 60 of searching a search space and presenting search results to a user is provided. In method 60, a user's search history is used to predict a search query that is used for conducting the various searches. Accordingly, method 60 is an embodiment in which the search is initiated automatically, or without direct user input.

In step 61, one or more item characteristics are identified based on a user's search history and a search query based on the identified characteristics is determined. For example, the system identifies that the user searches for a particular type of product on a monthly or quarterly basis, such as to reorder the product.

In step 62, a search based on the search query is performed. Based on the identified item characteristics, the first subset includes only a first characteristic for each item of the search space. At step 63, a second search of a second subset is performed asynchronously with respect to the execution of the first search. For example, as described herein, the second search is initiated after the first search is initiated and before or after the first search is concluded. The second subset includes those characteristics for each item of the search space not included in the first subset.

In step 64, the search results from the search of the first subset are presented to the user. The search results are presented to the user, for example, via the SUI 320. In this step, the user may select an item from the search results and/or select, for example, a search icon to view additional search results (e.g., any results from the second, supplemental search).

In step 65, and upon the user selecting the search icon, a request to view additional search results is received. In step 66, and responsive to receipt of the request to view additional search results, the results from the second, supplemental search are presented to the user.

Figure 17:
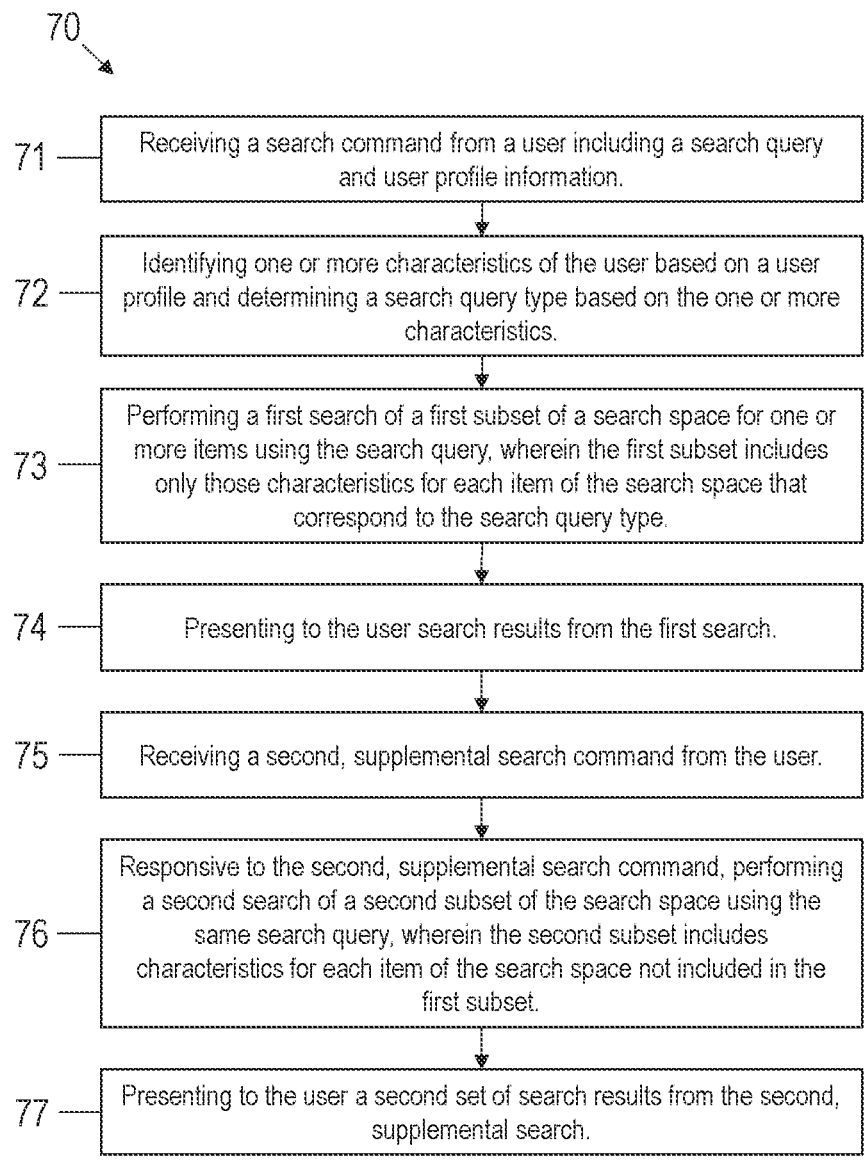
FIG. 17 illustrates a seventh flowchart for an exemplary embodiment of a method of searching a search space in accordance with one or more embodiments shown and described herein.

With reference now to FIG. 17, another exemplary method 70 of searching a search space and presenting search results to a user is provided. In method 70, user profile information is used to determine a type of query, and a second, supplemental search is initiated responsive to receiving a user request for a second search.

In step 71, a search command from a user is received, for example, via the SUI 320 (FIG. 2). The search command includes a search query and user profile information. In step 72, one or more characteristics of the user are identified and a search query type is determined based on the one or more characteristics. For example, the user profile information indicates that the user is associated with ABC Clinic, and the system associates a search query type of "product code" with users associated with ABC Clinic, since 90% of searches received from users associated with ABC Clinic are for product codes.

In step 73, a first search of a first subset of a search space for one or more items is performed using the search query, wherein the first subset includes only those characteristics for each item of the search space that correspond to the search query type. In this step, for example, if the search query type is a product code, the first subset includes only product codes for each item of the search space. In step 74, the search results are presented to the user. The search results are presented to the user, for example, via the SUI 320. In this step, the user may select an item from the search results and/or select, for example, a search icon to perform a second, supplemental search.

In step 75, and upon the user selecting the search icon, a second, supplemental search command is received. In step 76, and responsive to the second, supplemental search command, a second, supplemental search is performed. In this step, the second, supplemental search includes a search of only the second subset. In some embodiments, the second subset includes characteristics for each item of the search space that were not included in the first subset. For example, the second subset includes product type (e.g., glove, tape, mask, etc.), product colors, product sizes, etc., but will not include the item product codes included in the first subset. In step 77, a second set of results from the second, supplemental search is presented to the user.

Although described with reference to a first search of a first subset and a second search of a second subset, in embodiments, searches subsequent to the first search may be broken up into one or more searches of corresponding subsets or indices. For example, the first search is a search of product numbers (e.g., the first index includes product numbers), a second search includes a search of items corresponding to the product numbers in the first index (e.g., the second index includes a search of items corresponding the product numbers from the first index), and a third search includes a search of the remaining search space (e.g., the third index includes items that did not have product numbers or were otherwise not included in the first or second indices).

Figure 18:
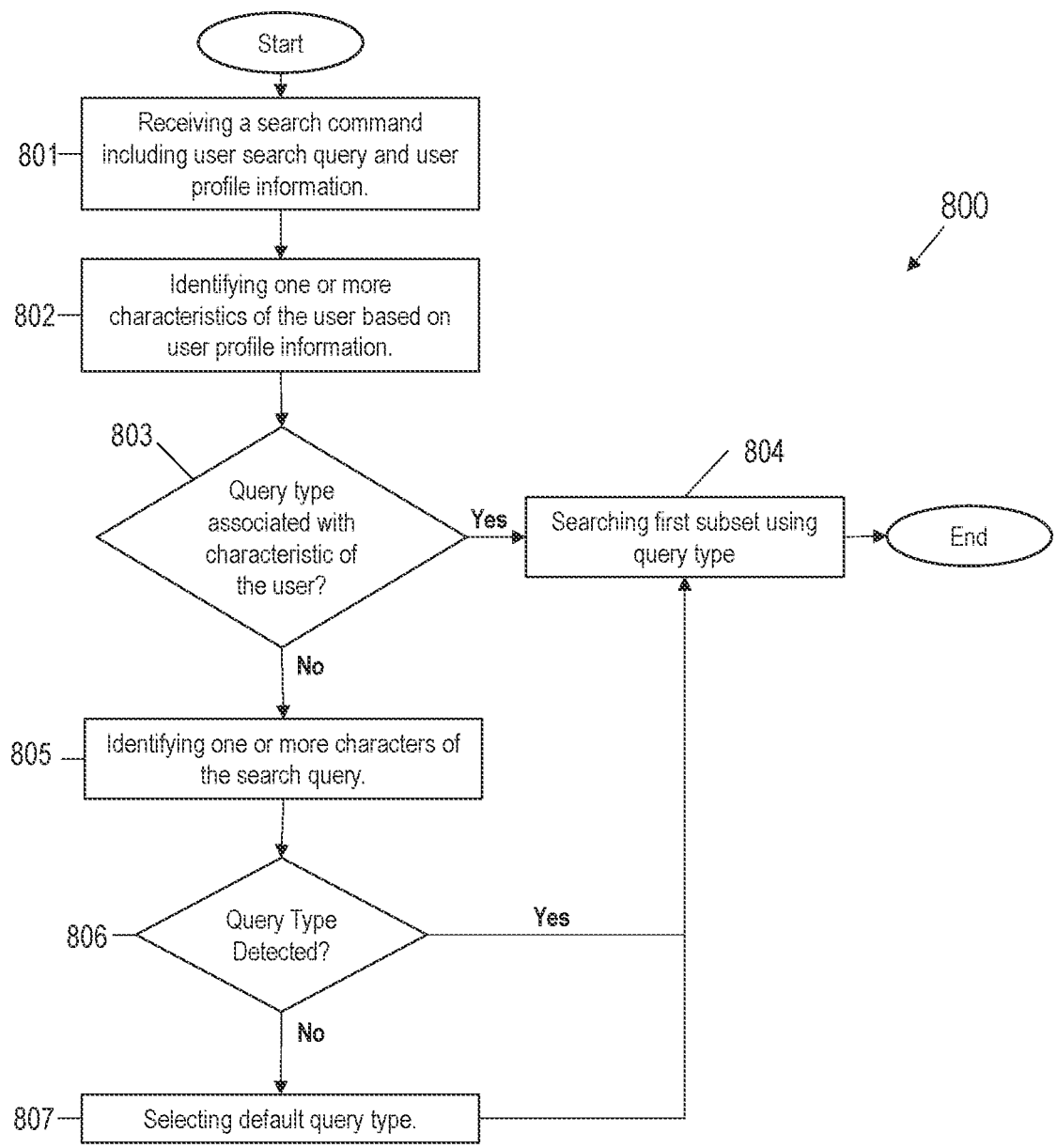
FIG. 18 illustrates a fourth exemplary embodiment of a process for searching a search space in accordance with one or more embodiments shown and described herein.

With reference to FIG. 18, an exemplary process 800 of determining a search query type is provided. The process 800 can be used, for example, in conjunction with one or more methods described herein, and represents a hierarchy that can be used to select a search query type.

The process 800 begins by receiving a search command including a user search query and user profile information (block 801). The search command is received, for example, through a SUI, as described herein. At block 802, one or more characteristics of the user are identified based on the user profile information. For example, an organizational affiliation for the user, a frequently used search query type for the user, or another characteristic is identified based on the user profile information. It should be understood that the particular characteristics that can be identified depend on the user profile information received and will vary based on the particular embodiment.

Next, at block 803, the system determines whether there is a query type associated with the one or more characteristics of the user. For example, in embodiments, an organization the user is affiliated with has an associated query type, or a demographic of the user is associated with a query type. In a more specific example, a specific hospital is associated with a product code query type, since 90% of searches from users affiliated with that hospital are product code searches. Accordingly, when a user is determined at block 802 to be affiliated with that hospital, a product code query type is identified at block 803. In another specific example, a type of organization (e.g., hospitals and medical offices) is associated with a product code query type, since 60% of searches from users affiliated with those organizational types are product code searches. Accordingly, when a user is determined at block 802 to be affiliated with that type or organization, a product code query type is identified at block 803. Associations between user characteristics and query types, in various embodiments, are stored in a look up table or other database accessible by the system performing the process 800.

When a query type is associated with the characteristic of the user (e.g., a "yes" at block 803), the process 800 proceeds with searching the first subset using the query type associated with the characteristic of the user at block 804. In the examples provided above, the searching would be performed using a product code query type. Although not shown in FIG. 18, in embodiments, the query type is used to automatically populate the first subset, as described above. For example, for a product code query type, product code numbers are selected as the first subset to be searched. From block 804, one or more methods and processes described herein can be followed.

When there is not a query type associated with the characteristic of the user identified at block 802 (e.g., a "no" at block 803), the search query is analyzed, and one or more characters of the search query are identified at block 805. For example, the search query is analyzed to determine whether it includes a pattern of characters indicative of a product code or another type of search. If a query type is detected (e.g., a "yes" at block 806), the process 800 proceeds with searching the first subset using the query type detected based on analysis of the search query. In the example provided above, the searching would be performed using a product code query type. Again, although not shown in FIG. 18, in embodiments, the query type is used to automatically populate the first subset, as described above. For example, for a product code query type, product code numbers are selected as the first subset to be searched. From block 804, one or more methods and processes described herein can be followed.

If, however, a query type is not detected upon analysis of the one or more characters of the search query (e.g., a "no" at block 806), a default query type is selected at block 807. For example, in embodiments, the default query type is the subset of items present in the search space. Accordingly, when another query type cannot be determined contextually (e.g., at block 803) or following analysis (e.g., at block 806), the process defaults to a predetermined query type. The default query type is then used for searching at block 804.

It should be appreciated that other query types can be identified contextually or via search command analysis, and the use of the product code query type is merely exemplary. Additionally, it is contemplated that other query types can be used as a default query type in place of the item subset, depending on the particular embodiment.

It is to be understood that the detailed description is intended to be illustrative, and not limiting to the embodiments described. Other embodiments will be apparent to those of skill in the art upon reading and understanding the above description. For example, in some exemplary embodiments, the second search including the second subset will take longer to perform than the first search including the first subset but not the second subset. In other exemplary embodiments, the two searches take about the same amount of time, but the first search uses fewer resources than the second search. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

We claim:

1. A method of searching, comprising:
   determining an attribute of a search based on an entry into a search field;
   generating a first search command including a search query, wherein the search query includes the attribute;
   splitting, in response to the first search command, a search space in a database into a first subset that includes a primary index and a second subset that includes a secondary index,
   wherein the second subset includes the remaining space not included in the first subset;
   selecting the first subset of the search space in the database including the primary index based on the attribute;
   selecting the second subset of the same search space in the same database including the secondary index,
   wherein the first subset and the second subset are part of the same search space in the same database, and
   wherein the primary index and the secondary index reduce time to conduct the search query and optimize speed and search performance for finding relevant information, in response to the search query;
   performing a first search of the attribute in the first subset of the search space using the first search command including the search query during a first time period, in response to a first request for the first search,
   wherein, based on the attribute, the first subset includes only a first characteristic for each item of the search space;
   performing a second search of the attribute in the second subset of the search space using a second search command including the same search query during a second time period and after the first time period, and in response to the first search being insufficient,
   wherein the second subset includes characteristics for each item of the search space not included in the first subset;

displaying to the user search results from the first search;
receiving a second request for a second, subsequent search, wherein the second request includes the same search query used in the first search;
responsive to the second, subsequent search query, presenting to the user search results from the second search;
identifying an item selected from the user search results from the second search;
moving the item to the first subset to increase a size of the first subset and reduce a size of the second subset; and
recording indexing data corresponding to the moving of the item to the first subset.

2. The method according to claim 1, further comprising moving additional items to the first subset.

3. The method according to claim 1, further comprising moving additional items to the first subset based on the additional items not being in inventory but at least one of being purchased above a threshold level, a threshold number of the additional items being from a same company or the additional items being manually selected by users.

4. The method according to claim 1, further comprising presenting to the user search results from the first search along with the presenting to the user search results from the second search.

5. The method according to claim 1, wherein the attribute is a product type, and wherein the first subset corresponds to product types for each item.

6. The method according to claim 1, wherein the second time period starts after the first time period ends.

7. The method according to claim 1, wherein generating the search query comprises at least one of receiving the search query from the user or re-using a prior search query from the user's search history.

8. The method according to claim 1, further comprising sorting the search results based on a number of times the one or more item characteristics appear in the user's search history.

9. The method according to claim 1, further comprising searching one or more indices of the search space comprising a plurality of indices using the search query based on information contained in the user's search history.

10. The method according to claim 1, further comprising generating the search query based on the user's search history.

11. The method according to claim 1, wherein the search query is a prior user search query from the user's search history.

12. The method according to claim 1, wherein only a first index of the plurality of indices of the search space is searched using the search query.

13. The method according to claim 1, wherein the search of the search space is a search of less than all of the indices in a plurality of indices of the search space.

14. The method according to claim 1, wherein the user search results are presented to the user responsive to at least one of determining that the user has logged in or receiving the search query.

15. The method according to claim 1, further comprising using at least one of a bot, an application programming interface (API) or artificial intelligence to at least one of create or update the first subset.

16. The method according to claim 1, wherein the user search results presented to the user are related to the search query.

17. The method according to claim 1, wherein one or more user directories or cache are monitored to identify the user's search history.

18. The method according to claim 1, identifying, by a bot, the user's search history and searching, by the bot, the search space via an API call.

19. The method according to claim 18, wherein the API call is a RESTful API call.

20. A system comprising:
one or more processors; and
one or more tangible, non-transitory memories configured to communicate with the one or more processors,
the one or more tangible, non-transitory memories having instructions stored thereon that, in response to execution by the one or more processors, cause the one or more processors to perform operations comprising:
determining an attribute of a search based on an entry into a search field;
generating a first search command including a search query, wherein the search query includes the attribute;
splitting, in response to the first search command, a search space in a database into a first subset that includes a primary index and a second subset that includes a secondary index,
wherein the second subset includes the remaining space not included in the first subset;
selecting the first subset of the search space in the database including the primary index based on the attribute;
selecting the second subset of the same search space in the same database including the secondary index,
wherein the first subset and the second subset are part of the same search space in the same database, and
wherein the primary index and the secondary index reduce time to conduct the search query and optimize speed and search performance for finding relevant information, in response to the search query;
performing a first search of the attribute in the first subset of the search space using the first search command including the search query during a first time period, in response to a first request for the first search,
wherein, based on the attribute, the first subset includes only a first characteristic for each item of the search space;
performing a second search of the attribute in the second subset of the search space using a second search command including the same search query during a second time period and after the first time period, and in response to the first search being insufficient,
wherein the second subset includes characteristics for each item of the search space not included in the first subset;
displaying to the user search results from the first search;
receiving a second request for a second, subsequent search, wherein the second request includes the same search query used in the first search;
responsive to the second, subsequent search query, presenting to the user search results from the second search;
identifying an item selected from the user search results from the second search;
moving the item to the first subset to increase a size of the first subset and reduce a size of the second subset; and
recording indexing data corresponding to the moving of the item to the first subset.

* * * * *